US012637595B2

(12) United States Patent
Matsumoto et al.

(10) Patent No.: US 12,637,595 B2
(45) Date of Patent: May 26, 2026

(54) PRESSURE-SENSITIVE ADHESIVE SHEET, OPTICAL MEMBER, AND TOUCH PANEL

(71) Applicant: NITTO DENKO CORPORATION, Ibaraki (JP)

(72) Inventors: Masamichi Matsumoto, Ibaraki (JP); Hirofumi Katami, Ibaraki (JP); Sho Takarada, Ibaraki (JP); Ryohei Sawazaki, Ibaraki (JP); Kazuma Mitsui, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 666 days.

(21) Appl. No.: 17/951,362

(22) Filed: Sep. 23, 2022

(65) Prior Publication Data

US 2023/0102451 A1 Mar. 30, 2023

(30) Foreign Application Priority Data

Sep. 24, 2021 (JP) ................................ 2021-155964
Aug. 19, 2022 (JP) ................................ 2022-131392

(51) Int. Cl.
*C09J 7/38* (2018.01)
*C08L 9/00* (2006.01)
(Continued)

(52) U.S. Cl.
CPC ................ *C09J 7/385* (2018.01); *C08L 9/00* (2013.01); *C09J 109/00* (2013.01); *C09J 133/08* (2013.01);
(Continued)

(58) Field of Classification Search
None
See application file for complete search history.

(56) References Cited

U.S. PATENT DOCUMENTS

| | | | |
|---|---|---|---|
| 7,097,903 | B2 | 8/2006 | Kishioka et al. |
| 2003/0232192 | A1 | 12/2003 | Kishioka et al. |

(Continued)

FOREIGN PATENT DOCUMENTS

| | | | |
|---|---|---|---|
| CN | 103391980 | A | 11/2013 |
| JP | 2003-238915 | A | 8/2003 |

(Continued)

OTHER PUBLICATIONS

Machine translation of JP_2020143242_A_I (Year: 2020).*

(Continued)

*Primary Examiner* — Frank D Ducheneaux
(74) *Attorney, Agent, or Firm* — Sughrue Mion, PLLC

(57) ABSTRACT

An object of the present invention is to provide a pressure-sensitive adhesive sheet, an optical member, and a touch panel that enable a pressure-sensitive adhesive layer to be formed, the pressure-sensitive adhesive layer allowing the appearance of a display device and an input device to be unlikely to deteriorate even under low pressure conditions. The pressure-sensitive adhesive sheet has a pressure-sensitive adhesive layer, and the number of the voids having a diameter of 300 μm or more in the following low pressure test is less than 10, and the number of the voids having a diameter of not less than 50 and less than 300 μm in the following low pressure test is less than 20.

11 Claims, 1 Drawing Sheet

(51) Int. Cl.
*C09J 109/00* (2006.01)
*C09J 133/08* (2006.01)
*G06F 3/041* (2006.01)

(52) U.S. Cl.
CPC ........ *G06F 3/0412* (2013.01); *C08L 2205/00* (2013.01); *C09J 2203/326* (2013.01); *C09J 2301/302* (2020.08); *C09J 2301/312* (2020.08); *C09J 2409/00* (2013.01); *C09J 2433/00* (2013.01)

(56) References Cited

U.S. PATENT DOCUMENTS

| | | | | |
|---|---|---|---|---|
| 2004/0191509 | A1 | 9/2004 | Kishioka et al. | |
| 2013/0302602 | A1 | 11/2013 | Takeda et al. | |
| 2014/0050874 | A1* | 2/2014 | Takeda | C09J 135/06 428/41.3 |
| 2014/0226085 | A1 | 8/2014 | Katami et al. | |
| 2014/0291294 | A1 | 10/2014 | Inaba | |
| 2015/0376477 | A1* | 12/2015 | Katami | C09J 133/18 428/209 |
| 2016/0000088 | A1 | 1/2016 | Nakamura et al. | |
| 2018/0244963 | A1* | 8/2018 | Takano | C09J 5/00 |
| 2023/0220247 | A1 | 7/2023 | Katami et al. | |
| 2023/0220248 | A1 | 7/2023 | Katami et al. | |

FOREIGN PATENT DOCUMENTS

| | | | | | |
|---|---|---|---|---|---|
| JP | 2003-342542 | A | | 12/2003 | |
| JP | 2004-231723 | A | | 8/2004 | |
| JP | 2014-193855 | A | | 10/2014 | |
| JP | 2014-198355 | A | | 10/2014 | |
| JP | 2017-112020 | A | | 6/2017 | |
| JP | 2020143242 | A | * | 9/2020 | C08F 220/28 |
| JP | 2021-195448 | A | | 12/2021 | |
| JP | 2021-195449 | A | | 12/2021 | |
| WO | 2007/029557 | A1 | | 3/2007 | |
| WO | 2013/168773 | A1 | | 11/2013 | |
| WO | 2021/251437 | A1 | | 12/2021 | |

OTHER PUBLICATIONS

Extended European Search Report dated Feb. 7, 2023 in European Application No. 22197116.1.

Notice of Reasons for Refusal issued Mar. 3, 2026 in Japanese Patent Application No. 2022-131392.

Communication issued Nov. 5, 2025 in Taiwanese Application No. 111135716.

* cited by examiner

[Fig. 1]
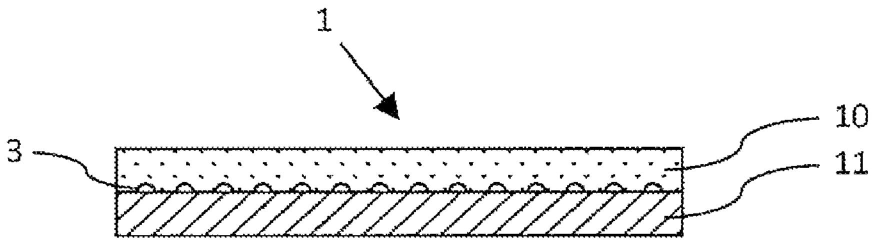
[Fig. 2]
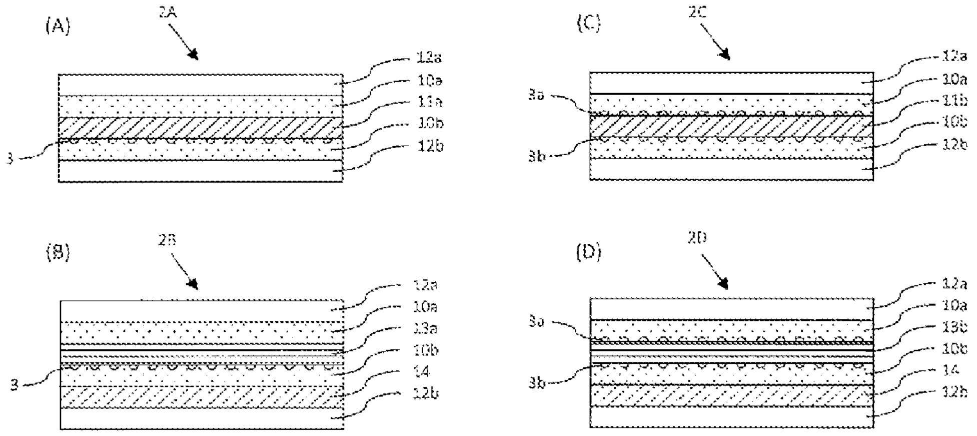

PRESSURE-SENSITIVE ADHESIVE SHEET, OPTICAL MEMBER, AND TOUCH PANEL

CROSS REFERENCE TO RELATED APPLICATIONS

This application claims priority to Japanese Patent Application No. 2021-155964 filed Sep. 24, 2021 and Japanese Patent Application No. 2022-131392 filed Aug. 19, 2002.

TECHNICAL FIELD

The present invention relates to a pressure-sensitive adhesive sheet, an optical member, and a touch panel.

BACKGROUND ART

In recent years, display devices such as liquid crystal displays (LCDs), and input devices such as touch panels, which are used in combination with such display devices, have been widely used in various fields. In these display devices, input devices, and the like, a pressure-sensitive adhesive sheet having a pressure-sensitive adhesive layer is used in applications for laminating optical members. For example, transparent pressure-sensitive adhesive sheets are used for laminating a touch panel with various display members and optical members (see e.g., Patent Literatures 1 to 3).

Particularly, in applications such as production of capacitive touch panels, a pressure-sensitive adhesive sheet may be laminated directly to a metal thin film or metal oxide thin film such as an ITO (indium tin oxide) film (hereinafter, metal thin films and metal oxide thin films may be generically referred to as "metal thin films").

In recent years, in applications such as production of capacitive touch panels, ones in which a film having metal mesh wiring obtained by processing a metal such as silver or copper into a mesh form (metal mesh film) or a film having a silver nanowire layer (AgNW layer) (silver nanowire film) is used as the metal thin film have increased, instead of conventional ITO films. A capacitive touch panel in which a metal mesh film or silver nanowire film is used is an input device that is highly sensitive by virtue of metal wiring having low resistance and widely applicable to displays of small to large sizes.

When optical members having metal wiring such as metal mesh films and silver nanowire films are laminated with a pressure-sensitive adhesive sheet intervened therebetween, there is a problem in that display irregularities are likely to occur in the periphery of an image display panel due to stress strain applied to the pressure-sensitive adhesive around the metal wiring or the like. Accordingly, the pressure-sensitive adhesive layer of a pressure-sensitive adhesive sheet for use in laminating optical members having metal wiring is required to have flexibility to relax the stress to the metal wiring in order to prevent such display irregularities.

CITATION LIST

Patent Literatures

Patent Literature 1 Japanese Patent Laid-Open No. 2003-238915

Patent Literature 2 Japanese Patent Laid-Open No. 2003-342542

Patent Literature 3 Japanese Patent Laid-Open No. 2004-231723

SUMMARY OF INVENTION

Technical Problem

However, display devices and input devices including optical members laminated by use of a highly-flexible pressure-sensitive adhesive sheet in order to prevent display irregularities have had a problem in that the appearance deteriorates under low pressure conditions in manufacture processes, cargo compartments of passenger aircrafts, highland regions, and the like.

Accordingly, an object of the present invention is to provide a pressure-sensitive adhesive sheet suitable for laminating a metal mesh film and the like, the pressure-sensitive adhesive sheet allowing the appearance of a display device and an input device to be unlikely to deteriorate even under low pressure conditions.

Another object of the present invention is to provide a high-performance optical member and a touch panel that comprise the pressure-sensitive adhesive sheet and the appearance of which is unlikely to deteriorate even under low pressure conditions.

Solution to Problem

A first aspect of the present invention provides a pressure-sensitive adhesive sheet having a pressure-sensitive adhesive layer. In the pressure-sensitive adhesive sheet of the first aspect of the present invention, the number of the voids having a diameter of 300 μm or more in the following low pressure test is less than 10, and the number of the voids having a diameter of not less than 50 and less than 300 μm in the following low pressure test is less than 20.

<Low Pressure Test>

A 5 cm×10 cm display panel having a lamination structure of a glass plate/a polarizing plate/a pressure-sensitive adhesive layer/a glass plate is provided as a sample. The thickness of the glass plate is 700 μm, the thickness of the polarizing plate is 115 (polarizing plate: 95+polarizing plate adhesive: 20) μm, and the thickness of the pressure-sensitive adhesive layer is 150 μm. The display panel is left to stand under heating and reduced pressure conditions at 23800 Pa and 65° C. for 8 hours, and after 30 minutes at room temperature under normal pressure, the diameter size and number of voids are visually measured.

Herein, the pressure-sensitive adhesive sheet of the first aspect of the present invention may be referred to as "the pressure-sensitive adhesive sheet of the present invention", and the pressure-sensitive adhesive layer composing "the pressure-sensitive adhesive sheet of the present invention" may be referred to as "the pressure-sensitive adhesive layer of the present invention".

In pressure-sensitive adhesive sheet of the present invention, a configuration in which the number of the voids having a diameter of 300 μm or more in the low pressure test described above is less than 10, and the number of the voids having a diameter of not less than 50 and less than 300 μm in the low pressure test described above is less than 20 is suitable in the viewpoint that the appearance of a display device and an input device is unlikely to deteriorate under low pressure conditions.

In pressure-sensitive adhesive sheet of the present invention, the largest diameter of the voids in the low pressure test described above is preferably 600 μm or less. This configuration is suitable in the viewpoint that the appearance of a display device and an input device is unlikely to deteriorate under low pressure conditions.

In pressure-sensitive adhesive sheet of the present invention, the gel fraction of the pressure-sensitive adhesive layer of the present invention is preferably 50% or more. This configuration is suitable in that the appearance of a display device and an input device is unlikely to deteriorate even under low pressure conditions.

In pressure-sensitive adhesive sheet of the present invention, the pressure-sensitive adhesive layer of the 300% tensile residual stress of the pressure-sensitive adhesive layer of the present invention is preferably 5 $N/cm^2$ or less. This configuration is suitable in that the flexibility is high and, even when a film having metal wiring such as a metal mesh film or silver nanowire film is laminated, the stress to the metal wiring is sufficiently relaxed to enable display irregularities to be prevented.

In pressure-sensitive adhesive sheet of the present invention, the pressure-sensitive adhesive layer of the present invention is preferably formed of a pressure-sensitive adhesive composition containing an acrylic polymer (A) and a hydrogenated polyolefinic resin (B). The pressure-sensitive adhesive layer of the present invention is also preferably formed of a pressure-sensitive adhesive composition that contains a mixture of monomer components constituting an acrylic polymer (A) or a partially polymerized product of the mixture of monomer components constituting the acrylic polymer (A), and a hydrogenated polyolefinic resin (B).

Herein, the pressure-sensitive adhesive composition constituting the pressure-sensitive adhesive layer of the present invention may be referred to as "the pressure-sensitive adhesive composition of the present invention".

The "acrylic polymer (A)" referred to herein is intended to include an "acrylic polymer (A)" and a "mixture of monomer components constituting the acrylic polymer (A) or a partially polymerized product of the mixture of monomer components constituting the acrylic polymer (A)", unless otherwise indicated.

The configuration in which the pressure-sensitive adhesive composition of the present invention contains the acrylic polymer (A) is preferable in that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented.

A configuration in which the pressure-sensitive adhesive composition of the present invention contains the hydrogenated polyolefinic resin (B) is suitable in that a pressure-sensitive adhesive layer can be achieved which allows the appearance of a display device and an input device to be unlikely to deteriorate even under low pressure conditions.

In the pressure-sensitive adhesive sheet of the present invention, the acrylic polymer (A) preferably contains a (meth)acrylic alkyl ester having an alkyl group having 8 or more carbon atoms as a constituent monomer component. The "(meth)acrylic alkyl ester having an alkyl group having 8 or more carbon atoms" herein may be referred to as the "(meth)acrylic alkyl ester (A)".

In the pressure-sensitive adhesive composition of the present invention, a configuration in which the acrylic polymer (A) contains a (meth)acrylic alkyl ester (A) as a constituent monomer component is preferable in that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented.

In the pressure-sensitive adhesive sheet of the present invention, the hydrogenated polyolefinic resin (B) preferably contains a hydrogenated polyolefin. In the pressure-sensitive adhesive composition of the present invention, the configuration including a hydrogenated polyolefin as the hydrogenated polyolefinic resin (B) is suitable in that a pressure-sensitive adhesive layer can be achieved that allows the appearance of a display device and an input device to be unlikely to deteriorate even under low pressure conditions.

In the pressure-sensitive adhesive sheet of the present invention, the hydrogenated polyolefinic resin (B) preferably further contains a hydrogenated polyolefin polyol. This configuration is suitable in that a pressure-sensitive adhesive layer that allows the appearance of a display device and an input device to be unlikely to deteriorate even under low pressure conditions can be achieved.

The thickness of the pressure-sensitive adhesive sheet of the present invention is preferably from 12 to 350 μm from the viewpoint that the stress to the metal wiring is sufficiently relaxed to enable display irregularities to be prevented and excellent appearance is likely to be retained.

A second aspect of the present invention provides an optical member having at least the pressure-sensitive adhesive sheet of the present invention and a substrate, wherein the substrate comprises metal wiring on at least one face, and the pressure-sensitive adhesive sheet is laminated on the face of the substrate on the side having the metal wiring. Herein, the optical member of the fifth aspect of the present invention may be referred to as "the optical member of the present invention".

A third aspect of the present invention provides a touch panel having at least the pressure-sensitive adhesive sheet of the present invention and a substrate, wherein the substrate comprises metal wiring on at least one face, and the pressure-sensitive adhesive sheet is laminated on the face of the substrate on the side having the metal wiring. Herein, the touch panel of the third aspect of the present invention may be referred to as "the touch panel of the present invention".

In the optical member of the present invention and the touch panel of the present invention, the metal wiring is preferably metal mesh wiring or silver nanowire.

In the optical member of the present invention and the touch panel of the present invention, the appearance of a display device and an input device is unlikely to deteriorate even under low pressure conditions, and display irregularities are unlikely to occur because metal wiring such as metal mesh wiring or silver nanowire is laminated by the pressure-sensitive adhesive sheet excellent in flexibility.

Advantageous Effects of Invention

The pressure-sensitive adhesive sheet of the present invention can provide a display device and an input device the appearance of which is unlikely to deteriorate even under low pressure conditions. When a film having metal wiring such as a metal mesh film or silver nanowire film is laminated, the stress to the metal wiring is sufficiently relaxed to enable display irregularities to be prevented. Accordingly, a high-performance optical member such as a touch panel of which the appearance is unlikely to deteriorate and in which display irregularities are unlikely to occur even under low pressure conditions can be efficiently produced by laminating a metal mesh film or silver nanowire film using the pressure-sensitive adhesive sheet of the present invention.

Thus, the pressure-sensitive adhesive sheet of the present invention can be preferably used in optical members having metal mesh wiring or a silver nanowire layer, particularly in applications for lamination on a transparent conductive film including a metal wiring layer formed, such as a metal mesh film and silver nanowire film.

BRIEF DESCRIPTION OF DRAWINGS

FIG. 1 is a schematic view illustrating a specific example of a preferable form of the optical member of the present invention.

FIG. 2 is a schematic view illustrating a specific example of a preferable form of the touch panel of the present invention.

DESCRIPTION OF EMBODIMENTS

[1. Pressure-Sensitive Adhesive Sheet, Pressure-Sensitive Adhesive Layer, and Pressure-Sensitive Adhesive Composition]

The pressure-sensitive adhesive sheet of the present invention is a pressure-sensitive adhesive sheet having a pressure-sensitive adhesive layer, wherein the number of the voids having a diameter of 300 μm or more in the following low pressure test is less than 10, and the number of the voids having a diameter of not less than 50 and less than 300 μm in the following low pressure test is less than 20.

<Low Pressure Test>

A 5 cm×10 cm display panel having a lamination structure of a glass plate/a polarizing plate/a pressure-sensitive adhesive layer/a glass plate is provided as a sample. The thickness of the glass plates is 700 μm, the thickness of the polarizing plate is 115 (polarizing plate: 95+polarizing plate adhesive: 20) μm, and the thickness of the pressure-sensitive adhesive layer is 150 μm. The display panel is left to stand under heating and reduced pressure conditions at 23800 Pa and 65° C. for 8 hours, and after 30 minutes at room temperatures under normal pressure, the diameter size and number of voids are visually measured.

Generation of fine air bubbles in the pressure-sensitive adhesive layer is considered to the cause of deterioration in the appearance of a display device and an input device under low pressure conditions. Accordingly, a configuration in which the number of the voids having a diameter of 300 μm or more in the low pressure test described above is less than 10, and the number of the voids having a diameter of not less than 50 and less than 300 μm in the low pressure test described above is less than 20 is preferable in that a pressure-sensitive adhesive layer can be achieved which allows the appearance of a display device and an input device to be unlikely to deteriorate even under low pressure conditions.

In the viewpoint that the pressure-sensitive adhesive sheet of the present invention makes the appearance of a display device or input device unlikely to deteriorate under low pressure conditions, the number of the voids having a diameter of 300 μm or more in the low pressure test described above is preferably 9 or less, more preferably 8 or less, further preferably 6 or less, and may be 5 or less or 4 or less. The lower limit of the number of the voids having a diameter of 300 μm or more in the low pressure test is, but not particularly limited to, most preferably 0.

In the viewpoint that the pressure-sensitive adhesive sheet of the present invention makes the appearance of a display device or input device unlikely to deteriorate under low pressure conditions, the number of the voids having a diameter of not less than 50 and less than 300 μm in the low pressure test described above is more preferably 15 or less, further preferably 10 or less. The lower limit of the number of the voids having a diameter of not less than 50 and less than 300 μm in the low pressure test described above is, but not particularly limited to, most preferably 0, and may be about 1.

In the viewpoint that the pressure-sensitive adhesive sheet of the present invention makes the appearance of a display device or input device unlikely to deteriorate under low pressure conditions, the largest diameter of the voids is preferably 600 μm or less in the low pressure test described above. In the viewpoint that the appearance of a display device and an input device is unlikely to deteriorate under low pressure conditions, the largest diameter of the voids in the low pressure test described above is preferably 300 μm or less, more preferably 250 μm or less, further preferably 200 μm or less, and may be 150 μm or less or 100 μm or less.

In the viewpoint that the pressure-sensitive adhesive sheet of the present invention makes the appearance of a display device or input device unlikely to deteriorate under low pressure conditions, the number of the voids having a diameter of 50 μm or less in the low pressure test described above is not particularly limited. In other words, the number of the voids having a diameter of 50 μm or less may be 100 or less although the effect on the appearance is small.

In the pressure-sensitive adhesive sheet of the present invention, the diameter of the voids and the number thereof in the low pressure test described above are measured specifically by the low pressure test in Examples listed below and can be adjusted by adjusting, for example, the monomer composition of the acrylic polymer (A), the type of a crosslinking agent and the amount thereof to be formulated, the type of the hydrogenated polyolefinic resin (B), the formulation ratio of the acrylic polymer (A) and the hydrogenated polyolefinic resin (B), and the like, mentioned below.

In the pressure-sensitive adhesive sheet of the present invention, the gel fraction of the pressure-sensitive adhesive layer of the present invention (the proportion of the solvent insoluble component) is preferably 50% or more, more preferably 55% or more, further preferably 60% or more, and may be 65% or more, in the viewpoint that the appearance of a display device and an input device is unlikely to deteriorate under low pressure conditions. The gel fraction of the pressure-sensitive adhesive layer of the present invention is preferably 90% or less, more preferably 85% or less, and may be 80% or less, from the viewpoint of imparting flexibility to the pressure-sensitive adhesive layer and enabling display irregularities to be prevented.

The gel fraction (the proportion of the solvent insoluble component) described above is specifically a value calculated by "Method for measuring gel fraction" below, for example.

About 0.1 g of the pressure-sensitive adhesive layer is collected from the pressure-sensitive adhesive sheet and wrapped with a porous tetrafluoroethylene sheet having an average pore diameter of 0.2 μm (trade name "NTF1122", manufactured by NITTO DENKO CORPORATION), and then tied up with a kite string. The weight at this time is measured, and this weight is defined as the weight before immersion. The weight before immersion is the total weight of the pressure-sensitive adhesive layer (the pressure-sensitive adhesive layer collected above), the tetrafluoroethylene sheet, and the kite string. The total weight of the tetrafluoroethylene sheet and the kite string is also measured, and this weight is defined as the packaging weight.

Next, the pressure-sensitive adhesive layer wrapped with the tetrafluoroethylene sheet and tied up with the kite string (referred to as the "sample") is put in a 50 ml vessel filled with ethyl acetate, followed by allowing to stand at 23° C. for 7 days. The sample (after ethyl acetate treatment) is then taken out of the vessel and transferred to an aluminum cup, followed by drying in a dryer at 130° C. for 2 hours to remove ethyl acetate. Thereafter, the weight is measured, and this weight is defined as the weight after immersion.

The gel fraction is then calculated according to the following formula.

$$\text{Gel fraction}[\%(\%\text{ by weight})]=(X-Y)/(Z-Y)\times 100$$

The gel fraction described above can be controlled by, for example, the monomer composition and weight average molecular weight of the acrylic polymer (A) mentioned below, the type and amount to be used (amount to be added) of the crosslinking agent, and the like. When the pressure-sensitive adhesive composition of the present invention is cured by ultraviolet irradiation, for example, polymerization inhibition is more unlikely to occur because of decrease in carbon-carbon double bonds of the hydrogenated polyolefinic resin (B) mentioned below, and the gel fraction can be prevented from decreasing.

The 300% tensile residual stress of the pressure-sensitive adhesive layer of the present invention is, but not particularly limited to, preferably 5 $N/cm^2$ or less, more preferably 4.5 $N/cm^2$ or less, further preferably 4 $N/cm^2$ or less, and may be 3.5 $N/cm^2$ or less or 3 $N/cm^2$ or less, in respect that the flexibility is excellent and, even when a film having metal wiring such as a metal mesh film or silver nanowire film is laminated, the stress to the metal wiring is sufficiently relaxed to enable display irregularities to be prevented. The 300% tensile residual stress of the pressure-sensitive adhesive layer of the present invention is not particularly limited, and may be 0.5 $N/cm^2$ or more or 1 $N/cm^2$ or more from the viewpoint of adhesion reliability.

The 300% tensile residual stress described above is a value ($N/cm^2$) obtained by tensioning the pressure-sensitive adhesive layer under a 23° C. environment up to an elongation (strain) of 300% in the lengthwise direction, retaining the elongation, determining the tensile stress (N) applied to the pressure-sensitive adhesive layer after lapse of 300 seconds from the completion of the tensioning, and dividing the tensile stress by the initial cross-sectional area (cross-sectional area before the tensioning) of the pressure-sensitive adhesive layer. The initial elongation of the pressure-sensitive adhesive layer is 100%.

The 300% tensile residual stress of the pressure-sensitive adhesive layer of the present invention is measured specifically according to method described in Examples listed below and can be adjusted by, for example, adjusting the monomer composition of the acrylic polymer (A) mentioned below, the type of a crosslinking agent and the amount thereof to be formulated, the type of the hydrogenated polyolefinic resin (B), the formulation ratio of the acrylic polymer (A) and the hydrogenated polyolefinic resin (B), and the like.

In the pressure-sensitive adhesive layer of the present invention, without particular limitation, the dielectric constant thereof is preferably controlled low from the viewpoint of prevention of a malfunction of optical members such as a touch panel having the pressure-sensitive adhesive layer. In the pressure-sensitive adhesive layer of the present invention, the dielectric constant at a frequency of 1 MHz is preferably 3.5 or less, more preferably 3.4 or less, further preferably 3.3 or less. The lower limit value of the dielectric constant at a frequency of 1 MHz is, but not particularly limited to, preferably 2.3 or more, more preferably 2.4 or more, further preferably 2.5 or more.

The dielectric constant at a frequency of 100 MHz is preferably 4.0 or less, more preferably 3.9 or less, further preferably 3.8 or less. The lower limit value of the dielectric constant at a frequency of 100 kHz is, but not particularly limited to, preferably 2.3 or more, more preferably 2.4 or more, further preferably 2.5 or more.

The dielectric constant of the pressure-sensitive adhesive layer of the present invention can be adjusted by, for example, adjusting the monomer composition of the acrylic polymer (A) mentioned below, the type of the hydrogenated polyolefinic resin (B), the formulation ratio of the acrylic polymer (A) and the hydrogenated polyolefinic resin (B), and the like.

The pressure-sensitive adhesive layer of the present invention has excellent transparency. For this reason, the visibility and appearance through the pressure-sensitive adhesive layer described above are excellent. As described above, the pressure-sensitive adhesive layer of the present invention is suitably used for optical purposes.

The haze of the pressure-sensitive adhesive layer of the present invention (in accordance with JIS K 7136) is, but not particularly limited to, preferably 1.0% or less, more preferably 0.8% or less. A haze of 1.0% or less is preferable because excellent transparency and excellent appearance can be obtained. The lower limit value of the haze is, but not particularly limited to, theoretically 0%, and may be practically more than 0.01%. The haze described above can be measured, for example, on a specimen made by allowing the pressure-sensitive adhesive layer (thickness: 100 μm) to stand under normal conditions (23° C., 50% RH) for at least 24 hours and then laminating the layer on slide glass (e.g., one having a total light transmittance of 92% and a haze of 0.2%), by use of a haze meter (manufactured by Murakami Color Research Laboratory Co., Ltd., trade name "HM-150N") or an equivalent thereof.

The total light transmittance in the visible light wavelength region of the pressure-sensitive adhesive layer of the present invention (in accordance with JIS K 7361-1) is, but not particularly limited to, preferably 90% or more, more preferably 91% or more, further preferably 92% or more. A case in which the total light transmittance is 90% or more is preferable because excellent transparency and an excellent appearance can be obtained. The upper limit value of the total light transmittance is, but not particularly limited to, theoretically a value obtained by subtracting the optical loss due to the reflection occurring at the air interface (Fresnel Loss) from 100%, and may be practically 95% or less. The total light transmittance described above can be measured, for example, on a specimen made by allowing the pressure-sensitive adhesive layer (thickness: 100 μm) to stand under normal conditions (23° C., 50% RH) for at least 24 hours, then, if the layer has a release liner, separating the release liner, and laminating the layer on slide glass (e.g., one having a total light transmittance of 92% and a haze of 0.2%), by use of a haze meter (manufactured by Murakami Color Research Laboratory Co., Ltd., trade name "HM-150N") or an equivalent thereof.

The method for producing the pressure-sensitive adhesive layer of the present invention is not particularly limited. For example, the pressure-sensitive adhesive layer can be produced by producing the pressure-sensitive adhesive composition of the present invention (precursor composition) and if necessary, conducting irradiation with active energy rays, heat-drying, or the like. Specific examples of the method include a method in which the pressure-sensitive adhesive layer is produced by adding and mixing the hydrogenated polyolefinic resin (B), other additives, and the like to the mixture of monomer components or a partially polymerized product thereof.

The pressure-sensitive adhesive layer of the present invention is preferably formed of a pressure-sensitive adhesive composition containing an acrylic polymer (A) and a hydrogenated polyolefinic resin (B).

The pressure-sensitive adhesive layer of the present invention is preferably formed of a pressure-sensitive adhesive composition containing a mixture of monomer components constituting an acrylic polymer (A) or a partially polymerized product of the mixture of monomer components constituting the acrylic polymer (A), and a hydrogenated polyolefinic resin (B).

The pressure-sensitive adhesive composition of the present invention may contain a polyfunctional (meth)acrylate, a silane coupling agent, and other additives mentioned below, besides those described above.

Herein, the "mixture of monomer components" described above is intended to include a case in which the mixture is constituted by a single monomer component and a case in which the mixture is constituted by two or more monomer components. The "partially polymerized product of the mixture of monomer components" described above means a composition in which one or two or more monomer components of the constituent monomer components of the "mixture of monomer components" described above are partially polymerized.

For example, when "the pressure-sensitive adhesive layer of the present invention contains an acrylic polymer (A) and a hydrogenated polyolefinic resin (B)" is referred to herein, a case in which the pressure-sensitive adhesive composition forming the pressure-sensitive adhesive layer of the present invention (the pressure-sensitive adhesive composition of the present invention) contains the acrylic polymer (A) and the hydrogenated polyolefinic resin (B) is intended to be also included. When the pressure-sensitive adhesive layer of the present invention contains a component other than the acrylic polymer (A) and the hydrogenated polyolefinic resin (B), the same applies to a case that the layer is free of or substantially free of the component.

The pressure-sensitive adhesive composition of the present invention may have any form, and examples thereof include an emulsion type, a thermofusible type (hot-melt type), a solventless type (active energy ray-curable type, e.g., a monomer mixture, or a monomer mixture and a partially polymerized product thereof). Particularly, the pressure-sensitive adhesive composition of the present invention is preferably not a solvent type. This is because defects in the appearance, such as orange peel, are likely to occur when a pressure-sensitive adhesive layer is attempted to be obtained by use of a solvent-type pressure-sensitive adhesive composition. "Orange peel" refers to a phenomenon in which unevenness like the skin of yuzu, a type of citrus fruit, occurs. The pressure-sensitive adhesive composition of the present invention is preferably an active energy ray-curable type in respect of obtaining a pressure-sensitive adhesive layer excellent in appearance. Herein, the pressure-sensitive adhesive composition means a composition to be used for forming the pressure-sensitive adhesive layer and is intended to include the meaning of a composition to be used for forming the pressure-sensitive adhesive.

The pressure-sensitive adhesive composition of the present invention is preferably not a solvent type, as described above, that is, is free of or substantially free of an organic solvent.

The organic solvent described above is not particularly limited as long as being an organic compound used as a solvent, and examples thereof include hydrocarbon solvents such as cyclohexane, hexane, and heptane; aromatic solvents such as toluene and xylene; ester solvents such as ethyl acetate and methyl acetate; ketone solvents such as acetone and methyl ethyl ketone; and alcohol solvents such as methanol, ethanol, butanol, and isopropyl alcohol. The organic solvent may be a mixed solvent including two or more organic solvents.

In the pressure-sensitive adhesive composition of the present invention, the phrase "substantially free of" an organic solvent refers to actively formulating no organic solvent except when an organic solvent is inevitably mixed. Specifically, it can be said that one in which the content of the organic solvent in the pressure-sensitive adhesive composition is 1.0% by weight or less (preferably 0.5% by weight or less, further preferably 0.2% by weight or less) based on the total amount of the pressure-sensitive adhesive composition (total weight, 100% by weight) is substantially free thereof.

As the base polymer constituting the pressure-sensitive adhesive composition of the present invention, an acrylic polymer is preferably included in respect of the transparency, weatherability, adhesion reliability, ease of function design of the pressure-sensitive adhesive layer due to abundance of types of monomers, and the like. In other words, the pressure-sensitive adhesive composition of the present invention is preferably an acrylic pressure-sensitive adhesive composition containing an acrylic polymer (A) mentioned below as the base polymer. Such acrylic polymers (A) may be used singly or in combination of two or more.

The content of the acrylic polymer (A) as the base polymer in the pressure-sensitive adhesive composition of the present invention is, but not particularly limited to, preferably 74% by weight or more (e.g., from 74 to 99.9% by weight), more preferably 80% by weight or more (e.g., from 80 to 99.9% by weight).

The pressure-sensitive adhesive composition of the present invention is more preferably free of or substantially free of a carboxyl group-containing monomer as a constituent monomer component constituting the acrylic polymer (A). Thus, the pressure-sensitive adhesive layer described above can obtain a corrosion prevention effect on metal wiring such as metal mesh wiring and silver nanowire. It can be said that one in which the content of a carboxyl group-containing monomer is preferably 0.05% by weight or less (e.g., from 0 to 0.05% by weight), more preferably 0.01% by weight or less (e.g., from 0 to 0.01% by weight), further preferably 0.001% by weight or less (e.g., from 0 to 0.001% by weight) based on the total amount of the pressure-sensitive adhesive composition described above is substantially free of a carboxyl group-containing monomer.

[1-1. Acrylic Polymer (A)]

The pressure-sensitive adhesive composition of the present invention is preferably an acrylic pressure-sensitive adhesive composition containing the acrylic polymer (A) as the main component. The specific content of the acrylic polymer (A) is, but not particularly limited to, preferably 74% by weight or more (e.g., from 74 to 99.9% by weight), more preferably 80% by weight or more (e.g., from 80 to 99.9% by weight) based on the total amount of the pressure-sensitive adhesive composition of the present invention (total weight, 100% by weight).

Examples of the pressure-sensitive adhesive composition of the present invention that forms the pressure-sensitive adhesive layer containing the acrylic polymer (A) as the main component include, but not particularly limited to, compositions containing the acrylic polymer (A) as an essential component; compositions containing a mixture of monomer components constituting the acrylic polymer (A) (may be referred to as a "monomer mixture") or a partially polymerized product thereof as an essential component. Without particular limitation, examples of the former include so-called water-dispersible compositions (emulsion compositions), and examples of the latter include so-called active energy ray-curable compositions. The pressure-sensitive adhesive composition described above may contain other additives.

The "monomer mixture" described above is intended to include a case in which the mixture is constituted by a single monomer component and a case in which the mixture is constituted by two or more monomer components. The "partially polymerized product" described above means a composition in which one or two or more components of the constituent components of the monomer mixture are partially polymerized. Of these, the pressure-sensitive adhesive composition is preferably a composition containing a monomer mixture or a partially polymerized product thereof as an essential component.

The acrylic polymer (A) is a polymer containing an acrylic monomer as an essential monomer unit (monomer constituent unit). In other words, the acrylic polymer (A) is a polymer containing a constituent unit derived from an acrylic monomer as a constituent unit. That is, the acrylic polymer (A) is a polymer composed (formed) of an acrylic monomer as an essential monomer component. Herein, "(meth)acryl" represents either one or both of "acryl" and "methacryl", and the same applies to the following. The weight average molecular weight of the acrylic polymer (A) is, but not particularly limited to, preferably from 100000 to 5000000.

The acrylic polymer (A) preferably contains a (meth)acrylic alkyl ester (A) ((meth)acrylic alkyl ester having an alkyl group having 8 or more carbon atoms) as an essential monomer unit. In other words, the acrylic polymer (A) of the present invention is preferably obtained by polymerizing a monomer component containing a (meth)acrylic alkyl ester having a medium chain to long chain alkyl group, such as a (meth)acrylic alkyl ester (A). The acrylic polymer (A) of the present invention is preferable in that, due to the action of the medium chain to long chain alkyl group, a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented.

Examples of the (meth)acrylic alkyl ester (A) include (meth)acrylic alkyl esters of which the alkyl group has 8 or more carbon atoms (preferably 8 to 24 carbon atoms) such as octyl (meth)acrylate, 2-ethylhexyl (meth)acrylate, isooctyl (meth)acrylate, nonyl (meth)acrylate, isononyl (meth) acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth) acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate. The (meth)acrylic alkyl esters (A) may be used singly or in combination of two or more.

As the (meth)acrylic alkyl ester (A), an acrylic alkyl ester is more preferable than a methacrylic alkyl ester, in respect that the polymerization time of the acrylic polymer (A) is reduced to enable the productivity to be improved. Particularly when the acrylic polymer (A) of the present invention is cured by radiation polymerization, an acrylic alkyl ester is suitable.

Of these, in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented, as the (meth)acrylic alkyl ester (A), a (meth) acrylic alkyl ester having a branched-chain alkyl group having 8 or more carbon atoms is preferably contained, a (meth)acrylic alkyl ester having a branched-chain alkyl group having 8 or 9 carbon atoms is preferably contained, 2-ethylhexyl (meth)acrylate is further preferably contained, and 2-ethylhexyl acrylate (2EHA) is particularly preferably contained. The number of carbon atoms in the side chain alkyl group of the branched-chain alkyl group described above is not particularly limited, and alkyl groups having 1 to 3 carbon atoms (e.g., a methyl group, an ethyl group, a n-propyl group, and an isopropyl group) are preferable. The "side chain alkyl group" is an alkyl group to be substituted at the side group of the carbon chain having the largest number of carbon atoms.

The content (proportion) of the (meth)acrylic alkyl ester (A) described above in the total monomer units of the acrylic polymer (A) (the total amount of the monomer components constituting the acrylic polymer (A)) is, but not particularly limited to, preferably from 30 to 95 parts by weight, more preferably from 35 to 90 parts by weight, further preferably from 40 to 85 parts by weight based on the total amount of the monomer components constituting the acrylic polymer (A) (100 parts by weight), in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented.

When the (meth)acrylic alkyl ester (A) contains a (meth) acrylic alkyl ester having a branched-chain alkyl group having 8 or 9 carbon atoms (hereinafter, may be referred to as a (meth)acrylic alkyl ester (A1) herein), a (meth)acrylic alkyl ester having a branched-chain alkyl group having 10 to 24 carbon atoms (hereinafter, may be referred to as a (meth)acrylic alkyl ester (A2) herein) is preferably further contained.

A case in which the (meth)acrylic alkyl ester (A) contains the (meth)acrylic alkyl ester (A2) in addition to the (meth) acrylic alkyl ester (A1) is preferable in that the dielectric constant of the pressure-sensitive adhesive layer of the present invention can be reduced due to the action of the long-chain branched-chain alkyl group and, even in the case of lamination on a transparent conductive film including a layer of metal wiring such as metal mesh wiring or silver nanowire formed, a malfunction can be prevented because the low dielectric constant of the pressure-sensitive adhesive layer.

The Tg of the homopolymer of the (meth)acrylic alkyl ester (A2) is preferably from −80 to 0° C., further preferably from −70 to ~10° C. A Tg of homopolymer of −80° C. or less is not preferable because the modulus of elasticity of the pressure-sensitive adhesive layer at normal temperature may decrease excessively, and a case of a Tg exceeding 0° C. is not preferable because the adhesive strength may decrease. The Tg of the homopolymer is a value measured with a differential scanning calorimeter (DSC). Although the branched-chain alkyl group having 10 to 24 carbon atoms has 10 to 24 carbon atoms in the view of satisfying a moderate low dielectric constant and elastic modulus, an alkyl (meth)acrylate having a preferable alkyl group can be selected as appropriate in accordance with a method for producing a (meth)acrylic polymer. For example, when a (meth)acrylic polymer is produced by solution polymerization or the like, the alkyl group has further preferably 10 to 18 carbon atoms, further preferably 10 to 16 carbon atoms, further preferably 10 to 14 carbon atoms. When the acrylic polymer (A) is produced by radiation polymerization or the like, the alkyl group has further preferably 12 to 18 carbon atoms, further preferably 14 to 18 carbon atoms.

Examples of the (meth)acrylic alkyl ester (A2) can include isodecyl acrylate (number of carbon atoms: 10, Tg of homopolymer=−60° ° C., hereinafter, simply abbreviated as Tg), isodecyl methacrylate (number of carbon atoms: 10, Tg=−41° C.), isomyristyl acrylate (number of carbon atoms: 14, Tg=−56° C.), isostearyl acrylate (number of carbon atoms: 18, Tg=−18° C.), 2-propylheptyl acrylate, isoundecyl acrylate, isododecyl acrylate, isotridecyl acrylate, isopentadecyl acrylate, isohexadecyl acrylate, isoheptadecyl acrylate, and the methacrylate monomers exemplified. The (meth)acrylic alkyl esters (A2) may be used singly or in combination of two or more.

Among the branched-chain alkyl groups having 10 to 24 carbon atoms, ones having a branched-chain alkyl group such as a t-butyl group at the end of the ester group are particularly preferable in that it is considered that the molar volume increases, the dipole moment decreases, and a pressure-sensitive adhesive layer having a balance between the both can be obtained. The ones are preferable also in respect of being excellent in the compatibility to the acrylic polymer (A) and the hydrogenated polyolefinic resin (B) of the present invention. As the branched-chain alkyl group provided at the end of the ester group, branched-chain alkyl groups having 4 to 6 carbon atoms such as a neopentyl group and a t-pentyl group are preferable, and a t-butyl group is particularly preferable. A preferable example of the (meth) acrylic alkyl ester (A2) having a t-butyl group at the end of the ester group includes isostearyl acrylate represented by the following formula.

[Formula 1]

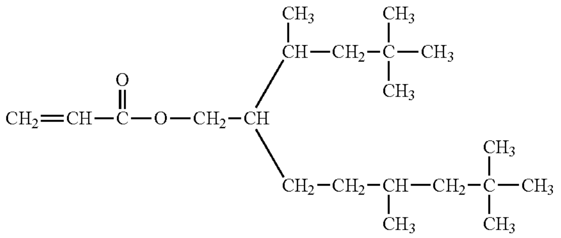

The content (proportion) of the (meth)acrylic alkyl ester (A1) described above in the total monomer units of the acrylic polymer (A) (the total amount of the monomer components constituting the acrylic polymer (A)) is, but not particularly limited to, preferably 30 parts by weight or more, more preferably 45 parts by weight or more, further preferably 50 parts by weight or more, and may be 55 parts by weight or more based on the total amount of the monomer components constituting the acrylic polymer (A) (100 parts by weight), in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented. The content described above is preferably 70 parts by weight or less, more preferably 65 parts by weight or less, further preferably 60 parts by weight or less, from the viewpoint of allowing the pressure-sensitive adhesive layer to have a low dielectric constant to thereby prevent a malfunction.

The content (proportion) of the (meth)acrylic alkyl ester (A2) described above in the total monomer units of the acrylic polymer (A) (100 parts by weight of the total amount of the monomer components constituting the acrylic polymer (A)) is, but not particularly limited to, preferably 10 parts by weight or more, more preferably 15 parts by weight or more, further preferably 20 parts by weight or more, from the viewpoint of allowing the pressure-sensitive adhesive layer to have a low dielectric constant to thereby prevent a malfunction. The content described above is preferably 50 parts by weight or less, more preferably 40 parts by weight or less, further preferably 35 parts by weight or less, particularly preferably 30 parts by weight or less, in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented.

The ratio of the content of the (meth)acrylic alkyl ester (A2) to the content of the (meth)acrylic alkyl ester (A1) described above (the content of the (meth)acrylic alkyl ester (A2)/the content of the (meth)acrylic alkyl ester (A1)) in the total monomer units of the acrylic polymer (A) (the total amount of the monomer components constituting the acrylic polymer (A)) is, but not particularly limited to, preferably 1.1 or less, more preferably 0.6 or less, further preferably 0.55 or less, particularly preferably 0.5 or less, and may be 0.45 or less, in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented. The ratio described above is preferably 0.2 or more, more preferably 0.25 or more, further preferably 0.3 or more, and may be 0.35 or more, from the viewpoint of allowing the pressure-sensitive adhesive layer to have a low dielectric constant to thereby prevent a malfunction.

The acrylic polymer (A) of the present invention may contain a (meth)acrylic alkyl ester other than the (meth) acrylic alkyl ester (A) (hereinafter, may be referred to as the "(meth)acrylic alkyl ester (B)") as a monomer component. Examples of the (meth)acrylic alkyl ester (B) described above include (meth)acrylic alkyl esters having a linear-or branched-chain alkyl group having 1 to 7 carbon atoms, and examples thereof include methyl (meth)acrylate, ethyl (meth)acrylate, propyl (meth)acrylate, isopropyl (meth) acrylate, butyl (meth)acrylate (n-butyl (meth)acrylate), isobutyl (meth)acrylate, s-butyl (meth)acrylate, t-butyl (meth)acrylate, pentyl (meth)acrylate, isopentyl (meth)acrylate, hexyl (meth)acrylate, and heptyl (meth)acrylate. The (meth)acrylic alkyl esters (B) may be used singly or in combination of two or more.

The content (proportion) of the (meth)acrylic alkyl ester (B) described above in the total monomer units of the acrylic polymer (A) (the total amount of the monomer components constituting the acrylic polymer (A)) is, but not particularly limited to, preferably 10 parts by weight or less, more preferably 5 parts by weight or less based on the total amount of the monomer components constituting the acrylic polymer (A) (100 parts by weight), in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented.

The acrylic polymer (A) may contain a monomer that can be copolymerized (copolymerizable monomer) as a monomer unit in addition to the (meth)acrylic alkyl ester (A) and (meth)acrylic alkyl ester (B) described above. That is, the acrylic polymer (A) may contain a copolymerizable monomer as a constituent monomer component. Copolymerizable monomers may be used singly or in combination of two or more.

Preferable examples of the copolymerizable monomer described above include hydroxyl group-containing monomers. When the acrylic polymer (A) contains a hydroxyl group-containing monomer as a monomer unit, polymerization is facilitated on polymerizing the constituent monomer components, and favorable cohesion is more easily obtained. Thus, strong adhesiveness is more easily obtained. Also, the gel fraction is increased, and a pressure-sensitive adhesive layer that allows the appearance of a display device and an input device to be unlikely to deteriorate even under low pressure conditions can be achieved. Additionally, excellent foaming and peeling resistance is more easily obtained. Further, whitening of the pressure-sensitive adhesive sheet, which may occur under a high-humidity environment, is more easily suppressed.

The content (proportion) of the hydroxyl group-containing monomer described above based on the total amount of the monomer components constituting the acrylic polymer (A) (100 parts by weight) is not particularly limited. When the amount of the hydroxyl group-containing monomer is equal to or larger than a certain amount, in respect of cohesion, adhesiveness and adhesion reliability such as foaming and peeling resistance are more easily obtained. The lower limit of the content of the hydroxyl group-containing monomer described above is preferably 0.1 parts by weight or more, more preferably 1 part by weight or more, further preferably 3 parts by weight or more. The upper limit of the content of the hydroxyl group-containing monomer is preferably 25 parts by weight or less, more preferably 20 parts by weight or less, further preferably 15 parts by weight or less in respect that the compatibility to the hydrogenated polyolefinic resin (B) is more easily obtained.

Further, preferable examples of the copolymerizable monomer described above include nitrogen atom-containing monomers. When the acrylic polymer (A) contains a nitrogen atom-containing monomer as a monomer unit, moderate cohesion is more easily obtained. Thus, the 180° (degree) peel adhesive strength to a glass plate and the 180° peel adhesive strength to an acryl plate are increased, and strong adhesiveness is more easily obtained. Also, the gel fraction is increased, and a pressure-sensitive adhesive layer that allows the appearance of a display device and an input device to be unlikely to deteriorate even under low pressure conditions can be achieved. Additionally, excellent foaming and peeling resistance is more easily obtained. Further, the moderate flexibility is more easily obtained via the pressure-sensitive adhesive layer, and even when the 300% tensile residual stress is adjusted within a specific range and a film having metal wiring such as a metal mesh film or silver nanowire film is laminated, the stress to the metal wiring is sufficiently relaxed to enable display irregularities to be prevented.

When the acrylic polymer (A) described above contains the nitrogen atom-containing monomer described above as a monomer component constituting the polymer, the proportion of the nitrogen atom-containing monomer in the total monomer components constituting the acrylic polymer (A) (100 parts by weight) is, but not particularly limited to, preferably 1 part by weight or more, more preferably 3 parts by weight or more, further preferably 5 parts by weight or more. The proportion described above of 1 part by weight or more is preferable from the viewpoint that favorable cohesion is more easily obtained and adhesion reliability at high temperatures is more easily obtained. Further, the proportion of this value is preferable because suppression of clouding under a high-humidity environment and durability are more improved, and higher adhesion reliability to metal mesh wiring or a silver nanowire layer can be obtained. The upper limit of the proportion of the nitrogen atom-containing monomer is preferably 30 parts by weight or less, more preferably 25 parts by weight or less, further preferably 20 parts by weight or less, in respect that a pressure-sensitive adhesive layer having moderate flexibility is obtained to prevent display irregularities and that a pressure-sensitive adhesive layer excellent in transparency is obtained.

The ratio of the hydroxyl group-containing monomer and the nitrogen atom-containing monomer contained in the acrylic polymer (A) (hydroxyl group-containing monomer/nitrogen atom-containing monomer) is not particularly limited, and can be selected as appropriate from the range of 95/5 to 5/95, preferably 90/10 to 10/90, more preferably 70/30 to 30/70, further preferably 60/40 to 40/60, particularly preferably 50/50 to 35/65, for example.

Further, preferable examples of the copolymerizable monomer described above include alicyclic structure-containing monomers. When the acrylic polymer (A) contains a nitrogen atom-containing monomer as a monomer unit, moderate cohesion is more easily obtained. Thus, the 180° (degree) peel adhesive strength to a glass plate and the 180° peel adhesive strength to an acryl plate are increased, and strong adhesiveness is more easily obtained. Also, the gel fraction is increased, and a pressure-sensitive adhesive layer that allows the appearance of a display device and an input device to be unlikely to deteriorate even under low pressure conditions can be achieved. Additionally, excellent foaming and peeling resistance is more easily obtained. Further, the moderate flexibility is more easily obtained via the pressure-sensitive adhesive layer, and even when the 300% tensile residual stress is adjusted within a specific range and a film having metal wiring such as a metal mesh film or silver nanowire film is laminated, the stress to the metal wiring is sufficiently relaxed to enable display irregularities to be prevented.

When the acrylic polymer (A) described above contains the alicyclic structure-containing monomer as a monomer component constituting the polymer, the proportion of the alicyclic structure-containing monomer in the total monomer components constituting the acrylic polymer (A) (100 parts by weight) is, but not particularly limited to, preferably 3 parts by weight or more, more preferably 10 parts by weight or more, in respect of improving durability and obtaining higher adhesion reliability to metal mesh wiring and a silver nanowire layer. The upper limit of the proportion of the alicyclic structure-containing monomer described above is preferably 50 parts by weight or less, more preferably 40 parts by weight or less, further preferably 30 parts by weight or less, in respect that a pressure-sensitive adhesive layer having moderate flexibility is obtained to prevent display irregularities.

The acrylic polymer (A) described above can be obtained by polymerizing the monomer unit (monomer component) described above by a known or customary polymerization method. Examples of the method for polymerizing the acrylic polymer (A) include a solution polymerization method, an emulsion polymerization method, a bulk polymerization method, and a polymerization method by an active energy-ray irradiation (active energy-ray polymerization method). Of these, in respect of transparency, water resistance, costs, and the like of the pressure-sensitive adhesive layer, the solution polymerization method and active energy-ray polymerization method are preferable, and the active energy-ray polymerization method is more preferable.

Examples of the active energy rays to be applied in the active energy-ray polymerization (photopolymerization) include ionizing radiation such as an α-ray, a β-ray, a γ-ray, a neutron ray, and an electron ray, and ultraviolet, and ultraviolet is particularly preferable. The irradiation energy, irradiation time, irradiation method, and the like of the active energy ray are not particularly limited, and it is only required that the reaction of the monomer components can be generated by activating a photopolymerization initiator.

In polymerization of the acrylic polymer (A), various common solvents may be used. Examples of such solvents include organic solvents such as: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. The solvents may be used singly or in combination of two or more.

In polymerization of the acrylic polymer (A), a polymerization initiator such as a thermal polymerization initiator or a photopolymerization initiator (photoinitiator) may be used depending on the type of polymerization reaction. The polymerization initiators may be used singly or in combination of two or more.

Examples of the photopolymerization initiator described above include, but not particularly limited to, benzoin ether photopolymerization initiators, acetophenone photopolymerization initiators, α-ketol photopolymerization initiators, aromatic sulfonyl chloride photopolymerization initiators, photoactive oxime photopolymerization initiators, benzoin photopolymerization initiators, benzyl photopolymerization initiators, benzophenone photopolymerization initiators, ketal photopolymerization initiators, and thioxantone photopolymerization initiators. The photopolymerization initiators may be used singly or in combination of two or more.

Examples of the benzoin ether photopolymerization initiators described above include benzoin methyl ether, benzoin ethyl ether, benzoin propyl ether, benzoin isopropyl ether, benzoin isobutyl ether, 2,2-dimethoxy-1,2-diphenylethane-1-on, and anisole methyl ether. Examples of the acetophenone photopolymerization initiators described above include 2,2-diethoxyacetophenone, 2,2-dimethoxy-2-phenylacetophenone, 1-hydroxycyclohexylphenylketone, 4-phenoxydicycloacetophenone, and 4-(t-butyl) dichloroacetophenone. Examples of the α-ketol photopolymerization initiators described above include 2-methyl-2-hydroxypropiophenone and 1-[4-(2-hydroxyethyl)phenyl]-2-methylpropan-1-one. Examples of the aromatic sulfonyl chloride photopolymerization initiators include 2-naphthalenesulfonyl chloride. Examples of the photoactive oxime photopolymerization initiators described above include 1-phenyl-1,1-propanedion-2-(o-ethoxycarbonyl)-oxime. Examples of the benzoin photopolymerization initiators described above include benzoin. Examples of the benzyl photopolymerization initiators described above include benzyl. Examples of the benzophenone photopolymerization initiators described above include benzophenone, benzoyl benzoate, 3,3'-dimethyl-4-methoxybenzophenone, polyvinyl benzophenone, and α-hydroxycyclohexyl phenyl ketone. Examples of the ketal photopolymerization initiators described above include benzyl dimethyl ketal. Examples of the thioxantone photopolymerization initiators described above include thioxantone, 2-chlorothioxantone, 2-methylthioxantone, 2,4-dimethylthioxantone, isopropylthioxantone, 2,4-diisopropylthioxantone, and dodecylthioxantone.

The amount of the photopolymerization initiator described above to be used is, but not particularly limited to, for example, preferably from 0.001 to 1 part by weight, more preferably from 0.01 to 0.50 parts by weight based on 100 parts by weight of the total monomer units of the acrylic polymer (A) (the total amount of the monomer components constituting the acrylic polymer (A)).

Examples of the thermal polymerization initiator include, but not particularly limited to, azo polymerization initiators, peroxide polymerization initiators (e.g., dibenzoyl peroxide and tert-butyl permaleate), and redox polymerization initiators. Of these, preferable are the azo polymerization initiators disclosed in Japanese Patent Laid-Open No. 2002-69411. Examples of the azo polymerization initiators described above include 2,2'-azobisisobutyronitrile (hereinafter, may be referred to as "AIBN"), 2,2'-azobis-2-methylbutyronitrile (hereinafter, may be referred to as "AMBN"), dimethyl 2,2'-azobis(2-2-methylpropionate), and 4,4'-azobis-4-cyanovaleric acid.

The amount of the thermal polymerization initiator described above to be used is, but not particularly limited to, for example, in the case of the azo polymerization initiator described above, preferably from 0.05 to 0.5 parts by weight, more preferably from 0.1 to 0.3 parts by weight based on 100 parts by weight of the total monomer units of the acrylic polymer (A) (the total amount of the monomer components constituting the acrylic polymer (A)).

[1-2. Carboxyl Group-Containing Monomer and the Like]

The pressure-sensitive adhesive composition of the present invention is preferably substantially free of a carboxyl group-containing monomer as a monomer component constituting the acrylic polymer (A). The phrase "substantially free of" herein refers to actively formulating no carboxyl group-containing monomer except when a carboxyl group-containing monomer is inevitably mixed. The carboxyl group-containing monomer means a monomer having at least one carboxyl group in the molecule. From the viewpoint that a superior corrosion prevention effect can be obtained, specifically, ones in which the content of the carboxyl group-containing monomer is preferably 0.05 parts by weight or less (e.g., from 0 to 0.05 parts by weight), more preferably 0.01 parts by weight or less (e.g., from 0 to 0.01 parts by weight), further preferably 0.001 parts by weight or less (e.g., from 0 to 0.001 parts by weight) based on the total amount of the monomer components constituting the acrylic polymer (A) (100 parts by weight) can be said to be substantially free of a carboxyl group-containing monomer. Examples of the carboxyl group-containing monomer described above include (meth)acrylic acid, itaconic acid, maleic acid, fumaric acid, crotonic acid, and isocrotonic acid. In the carboxyl group-containing monomers described above, acid anhydride group-containing monomers such as maleic anhydride and itaconic anhydride are also included.

Further, from the viewpoint that a superior corrosion prevention effect can be obtained, the pressure-sensitive adhesive composition of the present invention is not only substantially free of a carboxyl group-containing monomer as a monomer component constituting the acrylic polymer (A), but also preferably substantially free of a monomer having an acidic group other than a carboxyl group (sulfo group, phosphate group, or the like) as a monomer component constituting the acrylic polymer (A). That is, the acrylic polymer (A) is preferably substantially free of any of carboxyl group-containing monomers and monomers having an acidic group other than a carboxyl group, as a constituent monomer component. Specifically, ones in which the total amount of the carboxyl group-containing monomer and monomers having an acidic group other than a carboxy group as monomer components constituting the acrylic polymer (A) is preferably 0.05 parts by weight or less (e.g., from 0 to 0.05 parts by weight), more preferably from 0.01 parts by weight or less (e.g., from 0 to 0.01 parts by weight), further preferably 0.001 parts by weight or less (e.g., from 0 to 0.001 parts by weight) based on the total amount of the monomer components constituting the acrylic polymer (A) (100 parts by weight) can be said to be substantially free of a carboxyl group-containing monomer and monomers having an acidic group other than a carboxy group.

The pressure-sensitive adhesive composition of the present invention is preferably free of or substantially free of an acidic group-containing monomer as a monomer component constituting a polymer other than the acrylic polymer (A), from the similar viewpoint. For example, the pressure-sensitive adhesive composition of the present invention is preferably substantially free of a carboxyl group-containing monomer. The meaning of "substantially free of", a preferable extent, monomers having an acidic group other than a carboxyl group, and the like are the same as in the case of the monomer component constituting the acrylic polymer (A).

[1-3. Basic Group-Containing Monomer]

The pressure-sensitive adhesive composition of the present invention is preferably free of or substantially free of a basic group-containing monomer as a monomer component constituting the acrylic polymer (A). The respect in that being substantially free of a basic group-containing monomer also as a monomer component constituting a polymer other than the acrylic polymer (A) is preferable and being substantially free of a basic group-containing monomer in the pressure-sensitive adhesive layer described above is preferable even when the monomer is not a monomer component constituting various monomers is the same as in the case of the carboxyl group-containing monomer. The meaning of "substantially free of", a preferable extent, and the like are also the same.

[1-4. Hydroxyl Group-Containing Monomer]

A hydroxyl group-containing monomer means a monomer having at least one hydroxyl group in the molecule. A monomer having at least one hydroxyl group in the molecule and having at least one carboxyl group in the molecule is a carboxyl group-containing monomer and is intended not to be a hydroxyl group-containing monomer. Specific examples of the hydroxyl group-containing monomer described above include, but not particularly limited to, hydroxyl group-containing (meth)acrylic esters such as 2-hydroxyethyl (meth)acrylate, 2-hydroxypropyl (meth) acrylate, 2-hydroxybutyl (meth)acrylate, 3-hydroxypropyl (meth)acrylate, 4-hydroxybutyl (meth)acrylate, 6-hydroxyhexyl (meth)acrylate, hydroxyoctyl (meth)acrylate, hydroxydecyl (meth)acrylate, hydroxylauryl (meth)acrylate, and (4-hydroxymethylcyclohexyl) (meth)acrylate; vinyl alcohol, and allyl alcohol. Of these, as the hydroxyl group-containing monomer described above, hydroxyl group-containing (meth)acrylic esters are preferable, and 2-hydroxyethyl acrylate (HEA), 2-hydroxypropyl (meth)acrylate (HPA), and 4-hydroxybutyl acrylate (4HBA) are more preferable, from the viewpoint that favorable cohesion is more easily obtained and adhesion reliability at high temperatures is more easily obtained. The hydroxyl group-containing monomers may be used singly or in combination of two or more.

[1-5. Nitrogen Atom-Containing Monomer]

A nitrogen atom-containing monomer means a monomer having at least one nitrogen atom in the molecule (in one molecule). However, the nitrogen atom-containing monomer described above is intended not to be included in the hydroxyl group-containing monomers described above. That is, herein, a monomer having a hydroxyl group and a nitrogen atom in the molecule is intended to be included in the nitrogen atom-containing monomer. A monomer having at least one nitrogen atom in the molecule and having at least one carboxyl group in the molecule is intended to be a carboxyl group-containing monomer and not to be a nitrogen atom-containing monomer.

As the nitrogen atom-containing monomer described above, from the viewpoint of improving foaming and peeling resistance, N-vinyl cyclic amides, (meth)acrylamides, and the like are preferable. The nitrogen atom-containing monomers may be used singly or in combination of two or more.

As the N-vinyl cyclic amide described above, N-vinyl cyclic amides represented by the following formula (1) are preferable from the viewpoint that favorable cohesion is more easily obtained and adhesion reliability at high temperatures is more easily obtained.

[Formula 2]

(1)

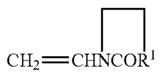

In formula (1), $R^1$ represents a divalent organic group.

$R^1$ in the above formula (1) is a divalent organic group, preferably a divalent saturated hydrocarbon group or unsaturated hydrocarbon group, more preferably a divalent saturated hydrocarbon group (e.g., an alkylene group having 3 to 5 carbon atoms).

The N-vinyl cyclic amide represented by the above formula (1) is preferably N-vinyl-2-pyrrolidone (NVP), N-vinyl-2-piperidone, N-vinyl-2-caprolactam, N-vinyl-3-morpholinone, N-vinyl-1,3-oxazin-2-one, N-vinyl-3,5-morpholine dione, or the like, more preferably N-vinyl-2-pyrrolidone or N-vinyl-2-caprolactam, further preferably N-vinyl-2-pyrrolidone, from the viewpoint of further improving foaming and peeling resistance, Examples of the (meth)acrylamides include (meth)acrylamide, N-alkyl (meth)acrylamides, and N, N-dialkyl (meth) acrylamides. Examples of the N-alkyl (meth)acrylamides described above include N-ethyl (meth)acrylamide, N-isopropyl (meth)acrylamide, N-n-butyl (meth)acrylamide, and N-octylacrylamide. Further, (meth)acrylamides having an amino group such as dimethylaminoethyl (meth)acrylamide, diethylaminoethyl (meth)acrylamide, and dimethylaminopropyl (meth)acrylamide are also included in the N-alkyl (meth)acrylamides. Examples of the N, N-dialkyl (meth) acrylamides described above include N, N-dimethyl (meth) acrylamide, N, N-diethyl (meth)acrylamide, N, N-dipropyl (meth)acrylamide, N, N-diisopropyl (meth)acrylamide, N, N-di (n-butyl) (meth)acrylamide, and N, N-di (t-butyl) (meth)acrylamide.

In the (meth)acrylamides described above, various N-hydroxyalkyl (meth)acrylamide, for example, are also included. Examples of the N-hydroxyalkyl (meth)acrylamide described above include N-methylol (meth)acrylamide, N-(2-hydroxyethyl) (meth)acrylamide, N-(2-hydroxypropyl) (meth)acrylamide, N-(1-hydroxypropyl) (meth)acrylamide, N-(3-hydroxypropyl) (meth)acrylamide, N-(2-hydroxybutyl) (meth)acrylamide, N-(3-hydroxybutyl) (meth) acrylamide, N-(4-hydroxybutyl) (meth)acrylamide, and N-methyl-N-2-hydroxyethyl (meth)acrylamide.

In the (meth)acrylamides described above, various N-alkoxyalkyl (meth)acrylamides, for example, are also included. Examples of the N-alkoxyalkyl (meth)acrylamide described above include N-methoxymethyl (meth)acrylamide and N-butoxymethyl (meth)acrylamide.

Examples of nitrogen atom-containing monomers other than the N-vinyl cyclic amides and (meth)acrylamides described above include amino group-containing monomers such as aminoethyl (meth)acrylate, dimethylaminoethyl (meth)acrylate, dimethylaminopropyl (meth)acrylate, and t-butylaminoethyl (meth)acrylate; cyano group-containing monomers such as acrylonitrile and methacrylonitrile; heterocycle-containing monomers such as (meth) acryloylmorpholine, N-vinylpiperazine, N-vinylpyrrole, N-vinylimidazole, N-vinylpyrazine, N-vinylmorpholine, N-vinylpyrazole, vinylpyridine, vinylpyrimidine, vinyloxazole, vinylisooxazole, vinylthiazole, vinylisothiazole, vinylpyridazine, (meth) acryloylpyrrolidone, (meth) acryloylpyrrolidine, (meth) acryloylpiperidine, and N-methylvinylpyrrolidone; imide group-containing monomers, such as maleimide monomers such as N-cyclohexylmaleimide, N-isopropylmaleimide, N-laurylmaleimide, and N-phenylmaleimide, itaconimide monomers such as N-methylitaconimide, N-ethylitaconimide, N-butylitaconimide, N-octylitaconimide, N-2-ethylhexylitaconimide, N-laurylitaconimide, and N-cyclohexylitaconimide, and succinimide monomers such as N-(meth)acryloyloxymethylene succinimide, N-(meth)acryloyl-6-oxyhexamethylene succinimide, and N-(meth)acryloyl-8-oxyoctamethylene succinimide; and isocyanate group-containing monomers such as 2-(meth)acryloyloxyethyl isocyanate.

[1-6. Alicyclic Structure-Containing Monomer]

An alicyclic structure-containing monomer means a monomer that has a polymerizable functional group having an unsaturated double bond such as a (meth)acryloyl group, a vinyl group, or the like and has an alicyclic structure. For example, (meth)acrylic alkyl esters having a cycloalkyl group are included in the alicyclic structure-containing monomers described above. However, a monomer having at least one alicyclic structure in the molecule and having at least one carboxyl group in the molecule is a carboxyl group-containing monomer and is intended not to be an alicyclic structure-containing monomer. The alicyclic structure-containing monomers may be used singly or in combination of two or more.

The alicyclic structure in the alicyclic structure-containing monomer described above is preferably a cyclic hydrocarbon structure, and has preferably 5 or more carbon atoms, more preferably 6 to 24 carbon atoms, further preferably 6 to 15 carbon atoms, particularly preferably 6 to 10 carbon atoms.

Examples of the alicyclic structure-containing monomer described above include (meth)acrylic monomers such as cyclopropyl (meth)acrylate, cyclobutyl (meth)acrylate, cyclopentyl (meth)acrylate, cyclohexyl (meth)acrylate, 3,3,5-trimethylcyclohexyl (meth)acrylate, cycloheptyl (meth) acrylate, cyclooctyl (meth)acrylate, isobornyl (meth)acrylate, dicyclopentanyl (meth)acrylate, HPMPA represented by the following formula (2), TMA-2 represented by the following formula (3), and HCPA represented by the following formula (4). In the following formula (4), the point of attachment at which the cyclohexyl ring and the structural formula in the parentheses are joined with a line is not particularly limited. Of these, isobornyl (meth)acrylate, cyclohexyl (meth)acrylate, and 3,3,5-trimethylcyclohexyl (meth)acrylate are preferable.

[Formula 3]

(2)

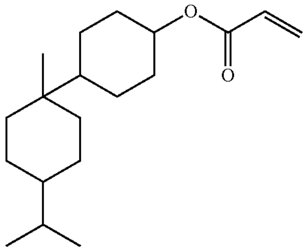

[Formula 4]

(3)

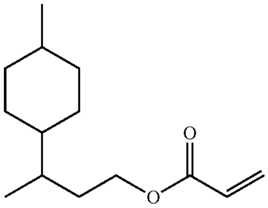

[Formula 5]

(4)

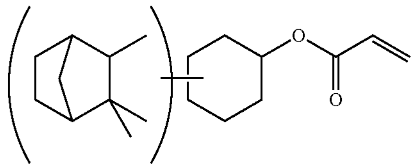

[1-7. Other Copolymerizable Monomers]

Examples of the copolymerizable monomer in the acrylic polymer (A) include, in addition to the nitrogen atom-containing monomers, hydroxyl group-containing monomers, and alicyclic structure-containing monomers described above, (meth)acrylic alkoxyalkyl esters [e.g., 2-methoxyethyl (meth)acrylate, 2-ethoxyethyl (meth)acrylate, methoxytriethyleneglycol (meth)acrylate, 3-methoxypropyl (meth)acrylate, 3-ethoxypropyl (meth)acrylate, 4-methoxybutyl (meth)acrylate, and 4-ethoxybutyl (meth) acrylate]; epoxy group-containing monomers [e.g., glycidyl (meth)acrylate and methylglycidyl (meth)acrylate]; sulfonic acid group-containing monomers [e.g., sodium vinylsulfonate]; phosphate group-containing monomers; (meth)acrylic esters having an aromatic hydrocarbon group

[e.g., phenyl (meth)acrylate, phenoxyethyl (meth)acrylate, and benzyl (meth)acrylate]; vinyl esters [e.g., vinyl acetate and vinyl propionate]; aromatic vinyl compounds [e.g., styrene and vinyl toluene]; olefins or dienes [e.g., ethylene, propylene, butadiene, isoprene, and isobutylene]; vinyl ethers [e.g., vinyl alkyl ether]; and vinyl chloride.

[1-8. Hydrogenated Polyolefinic Resin (B)]

The pressure-sensitive adhesive composition of the present invention is preferably an acrylic pressure-sensitive adhesive composition in which the acrylic polymer (A) is the main component and the hydrogenated polyolefinic resin (B) is formulated. Containing the hydrogenated polyolefinic resin (B), in addition to the acrylic polymer (A), in the pressure-sensitive adhesive composition of the present invention is preferable in the viewpoint that the appearance of a display device and an input device is unlikely to deteriorate under low pressure conditions. The hydrogenated polyolefinic resin (B) is a material having a low dielectric constant and preferable in that, by formulating the hydrogenated polyolefinic resin (B) to the acrylic polymer (A) of the present invention, a highly-flexible pressure-sensitive adhesive layer can be achieved without increasing the dielectric constant and without requiring lowering the molecular weight of the acrylic polymer (A), and even when a film having metal wiring such as a metal mesh film or silver nanowire film is laminated, the stress to the metal wiring is sufficiently relaxed to enable display irregularities to be prevented. The hydrogenated polyolefinic resin (B) is also excellent in the compatibility to the acrylic polymer (A) and thus preferable in that the transparency of the pressure-sensitive adhesive composition of the present invention can be maintained at a higher level. The hydrogenated polyolefinic resins (B) may be used singly or in combination of two or more.

The hydrogenated polyolefinic resin (B) is preferably one that exhibits liquid flowability at 25° C. in respect that a highly-flexible pressure-sensitive adhesive layer can be achieved and, even when a film having metal wiring such as a metal mesh film or silver nanowire film is laminated, the stress to the metal wiring is sufficiently relaxed to enable display irregularities to be prevented. The phrase "the hydrogenated polyolefinic resin (B) exhibits liquid flowability at 25° C." means that the viscosity measured at 25° C. with a B-type viscometer is 10,000 mPa·s or less.

The hydrogenated polyolefinic resin (B) is obtained by reducing carbon-carbon double bonds included in a polyolefinic resin by a hydrogenation reaction. The hydrogenated polyolefinic resin (B), of which carbon-carbon double bonds in the molecular have been reduced, is unlikely to cause inhibition of polymerization in curing the pressure-sensitive adhesive composition of the present invention with ultraviolet irradiation, for example, to thereby be unlikely to cause decrease in polymerization ratio and lowering of the molecular weight, thus enabling the adhesion reliability of the pressure-sensitive adhesive composition of the present invention at high temperatures to be maintained at a high level.

The hydrogenation ratio of the hydrogenated polyolefinic resin (B) is preferably 90% or more, more preferably 95% or more, further preferably 97% or more, from the viewpoint of making inhibition of polymerization unlikely to occur and of the adhesion reliability at high temperatures. The upper limit value of the hydrogenation ratio is, but not particularly limited to, theoretically 100% and may be practically 99.9% or less or may be 99.8% or less. The hydrogenation ratio of the hydrogenated polyolefinic resin (B) can be determined by quantifying the amount of double bonds remaining in the hydrogenated polyolefinic resin (B) by 1H-NMR measurement or the like.

The iodine value (I g/100 g) of the hydrogenated polyolefinic resin (B) is preferably 30 or less, more preferably 25 or less, further preferably 20 or less, from the viewpoint of making inhibition of polymerization unlikely to occur and of the adhesion reliability at high temperatures. The lower limit value of the iodine value, but not particularly limited to, may be 0.1 or more or may be 0.2 or more. The iodine value is a value as measured in accordance with JIS K 0070-1992.

The number average molecular weight (Mn) of the hydrogenated polyolefinic resin (B) is preferably from 1000 to 5000 in respect of imparting moderate stress relaxation properties and flowability to the pressure-sensitive adhesive layer and improving the compatibility to the acrylic polymer (A). The number average molecular weight (Mn) is preferably 1000 or more, more preferably 1500 or more, further preferably 1800 or more, in respect that moderate stress relaxation properties and flowability can be imparted to the pressure-sensitive adhesive composition. The number average molecular weight (Mn) is preferably 5000 or less, more preferably 4800 or less, further preferably 4600 or less, in respect of improving the compatibility to the acrylic polymer (A) and enabling the transparency of the pressure-sensitive adhesive composition of the present invention to be maintained at a higher level.

The polydispersity (Mw/Mn) of the hydrogenated polyolefinic resin (B) is preferably 2.0 or less, 1.8 or less, in respect of imparting moderate stress relaxation properties and flowability to the pressure-sensitive adhesive layer, improving the compatibility to the acrylic polymer (A), maintaining high-level transparency, and enabling haze to be suppressed. The lower limit value of the polydispersity, but not particularly limited to, may be practically 1.0 or may be 1.1 or more.

The number average molecular weight (Mn) and polydispersity (Mw/Mn) of the hydrogenated polyolefinic resin (B) are values determined by measurement by gel permeation chromatography (GPC) in terms of polystyrene standard.

The hydrogenated polyolefinic resin (B) contains a hydrogenated polyolefin. The pressure-sensitive adhesive composition of the present invention is suitable in that a pressure-sensitive adhesive layer that allows the appearance of a display device and an input device to be unlikely to deteriorate even under low pressure conditions can be achieved by containing a hydrogenated polyolefin as the hydrogenated polyolefinic resin (B).

The hydrogenated polyolefin described above is a hydrogenated product of a polymer having a constituent unit derived from an olefin (polyolefin). Examples of the hydrogenated polyolefin include hydrogenated products of homopolymers and copolymers of α-olefins such as ethylene, propylene, 1-butene, isobutene, and 1-hexene; diene compounds such as butadiene and isoprene; and aromatic vinyl compounds such as styrene. As the hydrogenated polyolefin, a hydrogenated product of a homopolymer or copolymer of a diene compound is preferable, and examples thereof include hydrogenated polybutadiene and hydrogenated polyisoprene. The hydrogenated polyolefins may be used singly or in combination of two or more.

The hydrogenated polyolefinic resin (B) preferably further contains a hydrogenated polyolefin polyol in addition to the hydrogenated polyolefin, in respect that a pressure-sensitive adhesive layer that allows the appearance of a display device and an input device to be unlikely to deteriorate even under low pressure conditions can be achieved.

The hydrogenated polyolefin polyol described above is a compound in which an end of the hydrogenated polyolefin is modified with a hydroxyl group. As the hydrogenated polyolefin polyol, a hydroxyl group-modified product of a hydrogenated product of a homopolymer or copolymer of a diene compound is preferable, and examples thereof include hydrogenated polybutadiene polyol and hydrogenated polyisoprene polyol. The hydrogenated polyolefin polyols may be used singly or in combination of two or more.

The hydrogenated polyolefin and hydrogenated polyolefin polyol described above are preferably hydrogenated polybutadiene and hydrogenated polybutadiene polyol, respectively, in the viewpoint that the appearance of a display device and an input device is unlikely to deteriorate under low pressure conditions, and in respect of imparting moderate stress relaxation properties and flowability to the pressure-sensitive adhesive layer and improving the compatibility to the acrylic polymer (A).

As the hydrogenated polybutadiene, one represented by the following formula (5) is preferable, and as the hydrogenated polybutadiene polyol, one represented by the following formula (6) is preferable.

[Formula 6]

(5)

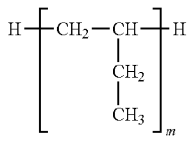

(6)

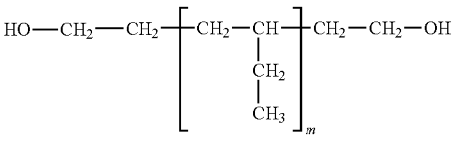

In the above formulas, m represents the degree of polymerization of the hydrogenated polybutadiene.

As the hydrogenated polyolefin and hydrogenated polyolefin polyol, commercially available products can be used. Examples of commercially available products of the hydrogenated polyolefin include trade names "BI-2000" and "BI-3000" (both manufactured by Nippon Soda Co., Ltd.). Examples of commercially available products of the hydrogenated polyolefin polyol include trade names "GI-1000", "GI-2000", and "GI-3000" (all manufactured by Nippon Soda Co., Ltd.) and trade name "EPOL" (manufactured by Idemitsu Kosan Co., Ltd.).

The content of the hydrogenated polyolefinic resin (B) in the pressure-sensitive adhesive composition described above is, but not particularly limited to, preferably 1 part by weight or more, more preferably 3 parts by weight or more, further preferably 5 parts by weight or more, and may be 8 parts by weight or more based on 100 parts by weight of the acrylic polymer, in the viewpoint that the appearance of a display device and an input device is unlikely to deteriorate under low pressure conditions. Meanwhile, the content of the hydrogenated polyolefinic resin (B) is preferably 35 parts by weight or less, more preferably 30 parts by weight or less, further preferably 25 parts by weight or less, from the viewpoint of suppressing increase in the haze and achieving higher transparency and from the viewpoint of enabling adhesive strength and adhesion reliability at high temperatures to be maintained at a high level.

The content of the hydrogenated polyolefin in the pressure-sensitive adhesive composition described above is, but not particularly limited to, preferably 0.5 parts by weight or more, more preferably 1 part by weight or more, further preferably 1.5 parts by weight or more, particularly preferably 2 parts by weight or more based on 100 parts by weight of the acrylic polymer (A), in the viewpoint that the appearance of a display device and an input device is unlikely to deteriorate under low pressure conditions. Meanwhile, the content of the hydrogenated polyolefin is preferably 20 parts by weight or less, more preferably 15 parts by weight or less, further preferably 12 parts by weight or less and may be 10 parts by weight or less or 5 parts by weight or less, from the viewpoint of suppressing increase in the haze and achieving higher transparency and from the viewpoint of enabling adhesive strength and adhesion reliability at high temperatures to be maintained at a high level.

The content of the hydrogenated polyolefin polyol in the pressure-sensitive adhesive composition described above is, but not particularly limited to, preferably 0.5 parts by weight or more, more preferably 1 part by weight or more, further preferably 3 parts by weight or more, and may be 5 parts by weight or more or 10 parts by weight or more based on 100 parts by weight of the acrylic polymer (A), in the viewpoint that the appearance of a display device and an input device is unlikely to deteriorate under low pressure conditions. Meanwhile, the content of the hydrogenated polyolefin polyol is preferably 30 parts by weight or less, more preferably 25 parts by weight or less, further preferably 20 parts by weight or less, particularly preferably 15 parts by weight or less from the viewpoint of suppressing increase in the haze and achieving higher transparency and from the viewpoint of enabling adhesive strength and adhesion reliability at high temperatures to be maintained at a high level.

The ratio of the content of the hydrogenated polyolefin to the content of the hydrogenated polyolefin polyol (hydrogenated polyolefin/hydrogenated polyolefin polyol) in the pressure-sensitive adhesive composition described above is, but not particularly limited to, preferably 5/95 or more, more preferably 12/88 or more and may be 15/85 or more, in the viewpoint that the appearance of a display device and an input device is unlikely to deteriorate under low pressure conditions. The ratio described above is preferably 90/10 or less, more preferably 80/20 or less, further preferably 70/30 or less and may be 55/45 or less, 45/55 or less, or 30/70 or less, in the viewpoint of suppressing increase in the haze and achieving higher transparency and in the viewpoint that the appearance of a display device and an input device is unlikely to deteriorate under low pressure conditions and the transparency is secured.

[1-9. Polyfunctional (Meth)Acrylate]

The pressure-sensitive adhesive composition of the present invention preferably further contains a polyfunctional (meth)acrylate. The polyfunctional (meth)acrylate serves as a crosslinking component. Then, the pressure-sensitive adhesive composition has moderate cohesion, and the appearance of a display device and an input device is more unlikely to decrease under low pressure conditions.

Examples of the polyfunctional (meth)acrylate include hexanediol di(meth)acrylate, butanediol di (meth)acrylate, (poly)ethylene glycol di(meth)acrylate, (poly) propylene glycol di(meth)acrylate, neopentyl glycol di (meth)acrylate, pentaerythritol di (meth)acrylate, pentaerythritol tri(meth) acrylate, dipentaerythritol hexa(meth)acrylate, trimethylpropane tri(meth)acrylate, tetramethylolmethane tri(meth)acrylate, allyl (meth)acrylate, vinyl (meth)acrylate, divinylbenzene, epoxy acrylate, polyester acrylate, and urethane acrylate. The polyfunctional (meth)acrylates may be used singly or in combination of two or more.

The content (proportion) of the polyfunctional (meth) acrylate is, but not particularly limited to, preferably 0.001 parts by weight or more, more preferably 0.002 parts by weight or more, further preferably 0.005 parts by weight or more, and may be 0.01 parts by weight or more based on 100 parts by weight of the acrylic polymer (A), in respect that a pressure-sensitive adhesive layer can be achieved which has moderate cohesion and allows the appearance of a display device and an input device to be unlikely to deteriorate even under low pressure conditions. The content (proportion) of the polyfunctional (meth)acrylate is preferably 0.5 parts by weight or less, more preferably 0.35 parts by weight or less, further preferably 0.2 parts by weight or less, and may be 0.1 parts by weight or less based on 100 parts by weight of the acrylic polymer (A), in respect that a highly-flexible pressure-sensitive adhesive layer can be achieved and in that the stress to the metal wiring is sufficiently relaxed to enable display irregularities to be prevented.

[1-10. Silane Coupling Agent]

The pressure-sensitive adhesive composition of the present invention preferably further contains a silane coupling agent. A case in which a silane coupling agent is contained in the pressure-sensitive adhesive composition is preferable in that excellent adhesiveness to glass (particularly, excellent adhesion reliability to glass at high temperatures and high humidity) is more easily obtained.

Examples of the silane coupling agent described above include, but not particularly limited to, γ-glycidoxypropyltrimethoxysilane, γ-glycidoxypropyltriethoxysilane, γ-aminopropyltrimethoxysilane, and N-phenyl-aminopropyltrimethoxysilane. Of these, γ-glycidoxypropyltrimethoxysilane is preferable. Further examples of the silane coupling agent include commercially available products such as trade name "KBM-403" (manufactured by Shin-Etsu Chemical Co., Ltd.). The silane coupling agents may be used singly or in combination of two or more.

The content of the silane coupling agent described above is, but not particularly limited to, preferably from 0.01 to 1 part by weight, more preferably from 0.03 to 0.5 parts by weight based on 100 parts by weight of the acrylic polymer (A), in respect of improving the adhesion reliability to glass.

[1-11. Crosslinking Agent]

The pressure-sensitive adhesive composition of the present invention is preferably not a solvent type, as described above, that is, is free of or substantially free of a crosslinking agent.

Examples of the crosslinking agent described above include isocyanate crosslinking agents, epoxy crosslinking agents, melamine crosslinking agents, and peroxide crosslinking agents and additionally include urea crosslinking agents, metal alkoxide crosslinking agents, metal chelate crosslinking agents, metal salt crosslinking agents, carbodiimide crosslinking agents, oxazoline crosslinking agents, aziridine crosslinking agents, and amine crosslinking agents. Particularly, the pressure-sensitive adhesive composition of the present invention is preferably free of or substantially free of an isocyanate crosslinking agent and/or epoxy crosslinking agent and is preferably free of or substantially free of an isocyanate crosslinking agent, as the crosslinking agent.

Examples of the isocyanate crosslinking agent (polyfunctional isocyanate compound) described above include lower aliphatic polyisocyanates such as 1,2-ethylene diisocyanate, 1,4-butylene diisocyanate, and 1,6-hexamethylene diisocyanate; alicyclic isocyanates such as cyclopentylene diisocyanate, cyclohexylene diisocyanate, isophorone diisocyanate, hydrogenated tolylene diisocyanate, and hydrogenated xylene diisocyanate; and aromatic polyisocyanates such as 2,4-tolylene diisocyanate, 2,6-tolylene diisocyanate, 4,4'-diphenylmethane diisocyanate, and xylylene diisocyanate. Examples of the isocyanate crosslinking agent also include commercially available products such as a trimethylolpropane/tolylene diisocyanate adduct [manufactured by Nippon Polyurethane Industry Co., Ltd., trade name "Coronate L"], a trimethylolpropane/hexamethylene diisocyanate adduct [manufactured by Nippon Polyurethane Industry Co., Ltd., trade name "Coronate HL"], and a trimethylolpropane/xylylene diisocyanate adduct [manufactured by Mitsui Chemicals, Inc., trade name "TAKENATE D-110N"].

Examples of the epoxy crosslinking agent (polyfunctional epoxy compound) described above include N, N,N', N'-tetraglycidyl-m-xylenediamine, diglycidylaniline, 1,3-bis(N, N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, diglycidyl adipate, diglycidyl o-phthalate, triglycidyl-tris (2-hydroxyethyl) isocyanurate, resorcin diglycidyl ether, and bisphenol-S-diglycidyl ether and additionally include epoxy resins having 2 or more epoxy groups in the molecule. Examples of the epoxy crosslinking agent also include commercially available products such as trade name "TETRAD C" manufactured by Mitsubishi Gas Chemical Company, Inc.

In the pressure-sensitive adhesive composition of the present invention, the phrase "substantially free of" a crosslinking agent refers to actively formulating no crosslinking agent except when a crosslinking agent is inevitably mixed. Specifically, it can be said that one in which the content of the crosslinking agent in the pressure-sensitive adhesive composition is 1.0% by weight or less (preferably 0.5% by weight or less, further preferably 0.2% by weight or less) based on the total amount of the pressure-sensitive adhesive composition (total weight, 100% by weight) is substantially free of a crosslinking agent. One in which the content thereof is preferably 0.05 parts by weight or less (e.g., from 0 to 0.05 parts by weight), more preferably 0.01 parts by weight or less (e.g., from 0 to 0.01 parts by weight), further preferably 0.001 parts by weight or less (e.g., from 0 to 0.001 parts by weight) based on the total amount of the monomer components constituting the acrylic polymer (A) (100 parts by weight) also can be said to be substantially free of a crosslinking agent.

[1-12. Additives]

In the pressure-sensitive adhesive composition of the present invention, known additives such as a crosslinking accelerator, a tackifier resin (a rosin derivative, a polyterpene resin, oil-soluble phenol, or the like), an antiaging agent, a filler, a colorant (dye, pigment, or the like), a UV absorbing agent, a chain transfer agent, a plasticizer, a softener, a surfactant, an antistatic agent, an anti-corrosive agent, and an antioxidant may be contained as required as long as characteristics of the present invention are not impaired. From the viewpoint of suppressing increase in the haze of the pressure-sensitive adhesive layer of the present invention, the pressure-sensitive adhesive composition of the present invention is preferably substantially free of an anti-corrosive agent and an antioxidant. Such additives may be used singly or in combination of two or more.

From the viewpoint of suppressing increase in the haze of the pressure-sensitive adhesive layer of the present invention, the pressure-sensitive adhesive composition of the present invention is preferably substantially free of an anti-corrosive agent and an antioxidant. The phrase "substantially free of" an anti-corrosive agent and an antioxidant refers to actively formulating neither anti-corrosive agent nor antioxidant except when an anti-corrosive agent and an antioxidant are inevitably mixed. Specifically, it can be said that one in which the content of the anti-corrosive agent and/or antioxidant in the pressure-sensitive adhesive composition is 1.0% by weight or less (preferably 0.5% by weight or less, further preferably 0.2% by weight or less) based on the total amount of the pressure-sensitive adhesive composition (total weight, 100% by weight) is substantially free of an anti-corrosive agent and/or antioxidant. One in which the content thereof is, for example, 0.5 parts by weight or less (e.g., from 0 to 0.5 parts by weight), preferably 0.05 parts by weight or less (e.g., from 0 to 0.05 parts by weight), more preferably 0.01 parts by weight or less (e.g., from 0 to 0.01 parts by weight), further preferably 0.001 parts by weight or less (e.g., from 0 to 0.001 parts by weight) based on the total amount of the monomer components constituting the acrylic polymer (A) (100 parts by weight) also can be said to be substantially free of an anti-corrosive agent and/or antioxidant.

[1-13. Preparation of Pressure-Sensitive Adhesive Composition]

The pressure-sensitive adhesive composition of the present invention can be prepared by mixing and homogeneously stirring an acrylic polymer (A), a hydrogenated polyolefinic resin (B), and as required, a polyfunctional (meth)acrylate, a silane coupling agent, and other additives. In this case, from the viewpoint of homogeneous preparation, a monomer component constituting the acrylic polymer (A) may be formulated as a diluent. For example, the hydrogenated polyolefinic resin (B) may be diluted with the monomer component and then added. When the monomer component constituting the acrylic polymer (A) is used as a diluent, in order to maintain the above-described properties of the pressure-sensitive adhesive layer, the acrylic polymer (A) is preferably prepared with a monomer mixture from which the monomer component used as the diluent has been removed. Preferable examples of a monomer component to be used as the diluent include, but not particularly limited to, (meth)acrylic alkyl esters (A1) ((meth)acrylic alkyl esters having a branched-chain alkyl group having 8 or 9 carbon atoms). The amount to be used of the monomer component used as the diluent is not particularly limited and is only required to be set as appropriate such that the pressure-sensitive adhesive composition can be homogeneously mixed.

[2. Pressure-Sensitive Adhesive Sheet]

The pressure-sensitive adhesive sheet of the present invention is only required to have the pressure-sensitive adhesive layer of the present invention (the pressure-sensitive adhesive layer formed of the pressure-sensitive adhesive composition of the present invention), and other respects are not particularly limited.

The pressure-sensitive adhesive sheet of the present invention may be a double-coated pressure-sensitive adhesive sheet of which both the surfaces is formed as a pressure-sensitive adhesive layer surface or may be a single-coated pressure-sensitive adhesive sheet of which only one surface is formed as a pressure-sensitive adhesive layer surface. Of these, from the viewpoint of laminating two members, the pressure-sensitive adhesive sheet is preferably a double-coated pressure-sensitive adhesive sheet. When the "pressure-sensitive adhesive sheet" is referred to herein, a tape-like sheet, that is, "pressure-sensitive adhesive tape" is also included. A surface of the pressure-sensitive adhesive layer herein may be called an "adhesive face".

The pressure-sensitive adhesive sheet of the present invention may be provided with a release liner on the adhesive face until used.

The pressure-sensitive adhesive sheet of the present invention may be a so-called "substrateless type pressure-sensitive adhesive sheet that has no substrate (substrate layer) (hereinafter, may be referred to as a "substrateless pressure-sensitive adhesive sheet") or may be a pressure-sensitive adhesive sheet having a substrate (hereinafter, may be referred to as a "pressure-sensitive adhesive sheet with a substrate"). Examples of the substrateless pressure-sensitive adhesive sheet described above include a double-coated pressure-sensitive adhesive sheet consisting only of the pressure-sensitive adhesive layer described above and a double-coated pressure-sensitive adhesive sheet comprising the pressure-sensitive adhesive layer and a pressure-sensitive adhesive layer other than the pressure-sensitive adhesive layer (may be referred to as "another pressure-sensitive adhesive layer"). Meanwhile, examples of the pressure-sensitive adhesive sheet having a substrate include a pressure-sensitive adhesive sheet having the pressure-sensitive adhesive layer on at least one face of the substrate. Of these, the substrateless pressure-sensitive adhesive sheet (substrateless double-coated pressure-sensitive adhesive sheet) is preferable, and the substrateless double-coated pressure-sensitive adhesive sheet consisting only of pressure-sensitive adhesive layer is more preferable. The "substrate (substrate layer)" does not include a release liner to be separated when the pressure-sensitive adhesive sheet is used (laminated).

[2-1. Other Physical Properties of Pressure-Sensitive Adhesive Sheet]

The 180° peel adhesive strength of the pressure-sensitive adhesive sheet of the present invention to a glass plate at a tensile speed of 300 mm/minute at 25° C. (particularly, the 180° peel adhesive strength of the adhesive face provided by the pressure-sensitive adhesive layer described above (the pressure-sensitive adhesive layer of the present invention) to a glass plate at a tensile speed of 300 mm/minute at 25° C.) is, but not particularly limited to, preferably 10 N/20 mm or more, more preferably 12 N/20 mm or more, further preferably 14 N/20 mm or more, further more preferably 16 N/20 mm or more, from the viewpoint that, when the adhesive strength is high, sufficient adherence to a metal surface such as metal mesh wiring, silver nanowire, or the like is obtained and the corrosion prevention effect is also improved. When the 180° peel adhesive strength of the pressure-sensitive adhesive sheet of the present invention to a glass plate at a tensile speed of 300 mm/minute at 25° C. is equal to or higher than a certain value, adhesiveness to glass and inhibition of lifting at a level difference are further excellent. The upper limit value of the 180° peel adhesive strength of the pressure-sensitive adhesive sheet of the present invention to a glass plate at a tensile speed of 300 mm/minute at 25° C. is, not particularly limited, for example, preferably 60 N/20 mm or less, more preferably 40 N/20 mm or less.

The 180° peel adhesive strength of the pressure-sensitive adhesive sheet of the present invention to a glass plate at a tensile speed of 300 mm/minute at 65° C. (particularly, the 180° peel adhesive strength of the adhesive face provided by the pressure-sensitive adhesive layer described above (the pressure-sensitive adhesive layer of the present invention) to a glass plate at a tensile speed of 300 mm/minute at 65° C.) is, but not particularly limited to, preferably 6 N/20 mm or more, more preferably 6.5 N/20 mm or more, further preferably 7 N/20 mm or more, further more preferably 7.5 N/20 mm or more, from the viewpoint of improvement in the adhesion reliability at high temperatures. When the 180° peel adhesive strength of the pressure-sensitive adhesive sheet of the present invention to a glass plate at a tensile speed of 300 mm/minute at 65° C. is equal to or higher than a certain value, adhesiveness to glass at high temperatures and inhibition of lifting at a level difference are further excellent. The upper limit value of the 180° peel adhesive strength of the pressure-sensitive adhesive sheet of the present invention to a glass plate at a tensile speed of 300 mm/minute at 65° C. is, not particularly limited, for example, preferably 60 N/20 mm or less, more preferably 40 N/20 mm or less.

The proportion of the 180° peel adhesive strength of the pressure-sensitive adhesive sheet of the present invention to a glass plate at a tensile speed of 300 mm/minute at 65° C. to the 180° peel adhesive strength thereof to a glass plate at a tensile speed of 300 mm/minute at 25° C. (180° peel adhesive strength to a glass plate at a tensile speed of 300 mm/minute at 65° C./180° peel adhesive strength to a glass plate at a tensile speed of 300 mm/minute at 25° C.×100) is, but not particularly limited to, preferably 30 or more, more preferably 35 or more, further preferably 40 or more, further more preferably 45 or more, from the viewpoint of improvement in the adhesive strength and adhesion reliability at high temperatures. The elastic modulus of the pressure-sensitive adhesive layer decreases at high temperatures, and thus the proportion generally becomes smaller. However, when the proportion of the pressure-sensitive adhesive sheet of the present invention is equal to or higher than a certain value, the adhesive strength and adhesion reliability to glass at high temperatures and inhibition of lifting at a level difference are further excellent. The upper limit value of the proportion described above, but not particularly limited to, may be practically 100 or less or may be 90 or less.

The 180° peel adhesive strength to a glass plate at a tensile speed of 300 mm/minute at 25° C. and 65° C. is determined by the following method for measuring the 180° peel adhesive strength. Examples of the glass plate include, but not particularly limited to, trade name "Soda lime glass #0050" (manufactured by Matsunami Glass Ind., Ltd.). Examples thereof also include alkali-free glass and chemically reinforced glass.

The 180° peel adhesive strength of the pressure-sensitive adhesive sheet of the present invention to an acrylic plate at a tensile speed of 300 mm/minute at 25° C. (particularly, the 180° peel adhesive strength of the adhesive face provided by the pressure-sensitive adhesive layer described above (the pressure-sensitive adhesive layer formed of the pressure-sensitive adhesive composition of the present invention) to an acrylic plate at a tensile speed of 300 mm/minute at 25° C.) is, but not particularly limited to, preferably 10 N/20 mm or more, more preferably 12 N/20 mm or more, further preferably 14 N/20 mm or more, from the viewpoint that, when the adhesive strength is high, sufficient adherence to a metal surface is obtained, and the corrosion prevention effect is also improved. The pressure-sensitive adhesive sheet of the present invention is preferable when the 180° peel adhesive strength to an acrylic plate at a tensile speed of 300 mm/minute at 25° C. is 10 N/20 mm because favorable adhesiveness to the acrylic plate and favorable inhibition of lifting at a level difference are more easily obtained. The upper limit value of the 180° peel adhesive strength of the pressure-sensitive adhesive sheet of the present invention to an acrylic plate at a tensile speed of 300 mm/minute at 25° C. is, but not particularly limited to, for example, 40 N/20 mm, more preferably 60 N/20 mm. The 180° peel adhesive strength to an acrylic plate at a tensile speed of 300 mm/minute at 25° C. is obtained by the following method for measuring the 180° peel adhesive strength.

Examples of the acrylic plate described above include, but not particularly limited to, PMMA plates (trade name "ACRYLITE", manufactured by Mitsubishi Rayon Co., Ltd.).

The above-described adhesive strength and the proportion of the adhesive strength of the pressure-sensitive adhesive sheet of the present invention can be adjusted by adjusting the monomer composition of the acrylic polymer (A), the type of the hydrogenated polyolefinic resin (B), the formulation ratio of the acrylic polymer (A) and the hydrogenated polyolefinic resin (B), and the like.

(A-1. Method for Measuring 180° Peel Adhesive Strength)

The adhesive face of the pressure-sensitive adhesive sheet is laminated to an object, subjected to pressure-bonding under pressure-bonding conditions of a 2-kg roller and one reciprocation, and aged under an atmosphere of 23° C. and 50% RH for 30 minutes. After the aging, the pressure-sensitive adhesive sheet is peeled off from the object in accordance with JIS Z 0237 under an atmosphere of 25° C. or 65° C. and 50% RH under conditions of a tensile speed of 300 mm/minute and a separation angle of 180°, and the 180° peel adhesive strength (N/20 mm) is measured.

(B. Thickness)

The thickness (total thickness) of the pressure-sensitive adhesive sheet of the present invention is, but not particularly limited to, preferably from 12 to 350 μm, more preferably from 12 to 300 μm. A case in which the thickness is equal to or larger than a certain thickness is preferable because the stress to the metal wiring is sufficiently relaxed to enable display irregularities to be prevented. A case in which the thickness is equal to or smaller than a certain thickness is preferable in that an excellent appearance is more easily retained during production and storage as a roll and adhesive stains are unlikely to occur during cutting processing. The thickness of the release liner is intended not to be included in the thickness of the pressure-sensitive adhesive sheet of the present invention.

(C. Haze)

The haze of the pressure-sensitive adhesive sheet of the present invention (in accordance with JIS K7136) is, but not particularly limited to, preferably 1.0% or less, more preferably 0.8% or less. A case in which the haze is 1.0% or less is preferable because excellent transparency and excellent appearance can be obtained. The lower limit value of the haze is, but not particularly limited to, theoretically 0%, and may be practically more than 0.01%. The haze described above can be measured, for example, on a specimen made by allowing the pressure-sensitive adhesive sheet to stand under normal conditions (23° C., 50% RH) for at least 24 hours, then, if the layer has a release liner, separating the release liner, and laminating the layer on slide glass (e.g., one having a total light transmittance of 92% and a haze of 0.2%), by use of a haze meter (manufactured by Murakami Color Research Laboratory Co., Ltd., trade name "HM-150N") or an equivalent thereof.

(D. Total Light Transmittance)

The total light transmittance in the visible light wavelength region (in accordance with JIS K7361-1) of the pressure-sensitive adhesive sheet of the present invention is, but not particularly limited to, preferably 90% or more, more preferably 91% or more, further preferably 92% or more. A case in which the total light transmittance is 90% or more is preferable because excellent transparency and an excellent appearance can be obtained. The upper limit value of the total light transmittance is, but not particularly limited to, theoretically a value obtained by subtracting the optical loss due to the reflection occurring at the air interface (Fresnel Loss) from 100%, and may be practically 95% or less. The total light transmittance described above can be measured, for example, on a specimen made by allowing the pressure-sensitive adhesive sheet to stand under normal conditions (23° C., 50% RH) for at least 24 hours, then, if the layer has a release liner, separating the release liner, and laminating the layer on slide glass (e.g., one having a total light transmittance of 92% and a haze of 0.2%), by use of a haze meter (manufactured by Murakami Color Research Laboratory Co., Ltd., trade name "HM-150N") or an equivalent thereof.

[2-2. Method for Producing Pressure-Sensitive Adhesive Sheet]

The pressure-sensitive adhesive sheet of the present invention is preferably produced in accordance with a known or customary production method, but not particularly limited thereto. For example, the pressure-sensitive adhesive sheet of the present invention, when being a substrateless pressure-sensitive adhesive sheet, can be obtained by forming the pressure-sensitive adhesive layer described above by the method described above on a release liner. Alternatively, the pressure-sensitive adhesive sheet of the present invention, when being a pressure-sensitive adhesive sheet with a substrate, may be obtained by forming the pressure-sensitive adhesive layer directly on the face of the substrate (direct application method), or may be obtained by once forming the pressure-sensitive adhesive layer on a release liner and providing the pressure-sensitive adhesive layer on the substrate by transferring (laminating) the pressure-sensitive adhesive layer onto the substrate (transfer method).

[2-3. Pressure-Sensitive Adhesive Layer of Pressure-Sensitive Adhesive Sheet] (Storage Elastic Modulus at 25° C.)

The storage elastic modulus at 25° C. of the pressure-sensitive adhesive layer of the present invention (the pressure-sensitive adhesive layer formed of the pressure-sensitive adhesive composition of the present invention) is, but not particularly limited to, preferably 0.01 MPa or more, more preferably 0.05 MPa or more, further preferably 0.1 MPa or more. A case in which the storage elastic modulus is 0.01 MPa or more is preferable because favorable adhesion reliability is more easily obtained. The storage elastic modulus at 25° C. of the pressure-sensitive adhesive layer is preferably 0.5 MPa or less, more preferably 0.4 MPa or less, in respect that a highly-flexible pressure-sensitive adhesive layer can be achieved and that the stress to the metal wiring is sufficiently relaxed to enable display irregularities to be prevented. The storage elastic modulus of the pressure-sensitive adhesive layer is measured via dynamic viscoelasticity.

The storage elastic modulus of the pressure-sensitive adhesive layer of the present invention can be adjusted by adjusting the monomer composition of the acrylic polymer (A), the type of the hydrogenated polyolefinic resin (B), the formulation ratio of the acrylic polymer (A) and the hydrogenated polyolefinic resin (B), and the like.

(Thickness)

The thickness of the pressure-sensitive adhesive layer described above (particularly, the pressure-sensitive adhesive layer formed of the pressure-sensitive adhesive composition of the present invention) is, but not particularly limited to, preferably 12 to 350 μm, more preferably 12 to 300 μm. A case in which the thickness is equal to or larger than a certain thickness is preferable in that the stress to the metal wiring is sufficiently relaxed to enable display irregularities to be prevented. A case in which the thickness is equal to or smaller than a certain thickness is preferable because the handleability and manufacturability are particularly excellent.

(Production Method)

An example of the method for producing the pressure-sensitive adhesive layer described above include, but not particularly limited to, applying (coating) the pressure-sensitive adhesive composition described above on a substrate or release liner followed by drying, curing, or drying and curing, as required.

For application (coating) of the pressure-sensitive adhesive composition described above, a known coating method may be used. For example, a coater, such as a gravure roll coater, a reverse roll coater, a kiss roll coater, a dip roll coater, a bar coater, a knife coater, a spray coater, a comma coater, or a direct coater may be used.

[2-4. Other Layers of Pressure-Sensitive Adhesive Sheet]

The pressure-sensitive adhesive sheet of the present invention may have other layers in addition to the pressure-sensitive adhesive layer described above. Examples of the other layers include a different pressure-sensitive adhesive layer (pressure-sensitive adhesive layer other than the pressure-sensitive adhesive layer described above (pressure-sensitive adhesive layer other than the pressure-sensitive adhesive layer formed of the pressure-sensitive adhesive composition of the present invention)), an intermediate layer, and an undercoat layer. The pressure-sensitive adhesive sheet of the present invention may have 2 or more other layers.

[2-5. Substrate for Pressure-Sensitive Adhesive Sheet]

Examples of the substrate in a case in which the pressure-sensitive adhesive sheet of the present invention is a pressure-sensitive adhesive sheet with a substrate include, but not particularly limited to, plastic films and various optical films such as an antireflection (AR) film, a polarizing plate, and a retardation plate. Examples of materials for the plastic films and the like include plastic materials, such as polyester resins such as polyethylene terephthalate (PET), acrylic resins such as polymethyl methacrylate (PMMA), polycarbonate, triacetyl cellulose (TAC), polysulfone, polyarylate, polyimide, polyvinyl chloride, polyethylene, polypropylene, ethylene-propylene copolymers, and cyclic olefinic polymers such as trade name "ARTON (cyclic olefinic polymer, manufactured by JSR Corporation)" and trade name "ZEONOR (cyclic olefinic polymer, manufactured by Zeon Corporation)". These plastic materials may be used singly or in combination of two or more. The "substrate" described above is a portion to be laminated to an object together with the pressure-sensitive adhesive layer when the pressure-sensitive adhesive sheet is laminated to the object. The release liner to be separated in use (lamination) of the pressure-sensitive adhesive sheet is not included in the "substrate".

The substrate described above is preferably transparent. The total light transmittance in the visible light wavelength region of the substrate (in accordance with JIS K 7361-1) is, but not particularly limited to, preferably 85% or more, more preferably 88% or more. The haze of the substrate (in accordance with JIS K7136) is, but not particularly limited to, preferably 1.0% or less, more preferably 0.8% or less. Examples of such a transparent substrate include PET films, and non-oriented films such as trade name "ARTON" and trade name "ZEONOA".

The thickness of the substrate is, but not particularly limited to, preferably from 12 to 500 μm. The substrate may have either of a single layer form and a multilayer form. The surface of the substrate may be appropriately subjected to a known and customary surface treatment, for example, a physical treatment such as a corona discharge treatment or a plasma treatment or a chemical treatment such as a base coat treatment.

[2-6. Release Liner of Pressure-Sensitive Adhesive Sheet]

The pressure-sensitive adhesive sheet of the present invention may be provided with a release liner on the adhesive face until used. When the pressure-sensitive adhesive sheet of the present invention is a double-coated pressure-sensitive adhesive sheet, each adhesive face may be protected by a release liner or may be protected in a roll form wound with one release liner having a release face on each side. The release liner is used as a protective material of the pressure-sensitive adhesive layer and peeled off in lamination of the sheet onto the object. When the pressure-sensitive adhesive sheet of the present invention is a substrateless pressure-sensitive adhesive sheet, the release liner also serves as a support for the pressure-sensitive adhesive layer. The release liner may not necessarily be provided.

Examples of the release liner described above include, but not particularly limited to, a release liner having a release layer (release-treated layer) on at least one surface of the release liner substrate, a low-adhesive release liner comprising a fluorine polymer, and a low-adhesive release liner comprising a non-polar polymer. Examples of the fluorine polymer described above include, but not particularly limited to, polytetrafluoroethylene, polychlorotrifluoroethylene, polyvinyl fluoride, polyvinylidene fluoride, tetrafluoroethylene-hexafluoropropylene copolymers, and chlorofluoroethylene-vinylidene fluoride copolymers. Examples of the non-polar polymer described above include, but not particularly limited to, olefinic resins such as polyethylene (PE) and polypropylene (PP). Of these, a release liner having a release layer on at least one surface of the release liner substrate is preferably used.

Examples of the release liner substrate described above include, but not particularly limited to, plastic films. Examples of such plastic films include plastic films constituted by a polyester resin such as polyethylene terephthalate (PET), polyethylene naphthalate (PEN), or polybutylene terephthalate (PBT); an olefinic resin including α-olefin as a monomer component, such as polyethylene (PE), polypropylene (PP), polymethylpentene (PMP), an ethylene-propylene copolymer, or an ethylene-vinyl acetate copolymer (EVA); polyvinyl chloride (PVC); a vinyl acetate resin; polycarbonate (PC); polyphenylene sulfide (PPS); an amide resin such as polyamide (nylon) or all-aromatic polyamide (aramide); a polyimide resin; or polyether ether ketone (PEEK). Of these, plastic films formed of a polyester resin are preferable, and PET films are further preferable, from the viewpoint of processability, availability, workability, dust-proofness, costs, and the like.

Examples of a release treatment agent constituting the release layer described above include, but not particularly limited to, release treatment agents such as silicone release treatment agents, fluorine release treatment agents, long chain alkyl release treatment agents, and molybdenum sulfide. Of these, silicone release treatment agents are preferable from the viewpoint of release control and stability over time. The release treatment agent may be used singly or in combination of two or more.

The release layer may be a single layer, or may have a lamination structure in which 2 or more layers are laminated as long as characteristics of the present invention are not impaired.

Of these, one example of a specific configuration of the release liner include a configuration in which a PET film is used as a release liner substrate and a release layer including a silicone release treatment agent is provided on at least one surface of the release liner substrate. Of both the surfaces of the release liner, the surface that is opposite to the side in contact with the pressure-sensitive adhesive layer and on which no release liner is provided may be referred to as the "back face" of the release liner.

In the release liner, a carrier material may be laminated on the back face, from the viewpoint that punching processability and handleability are ensured and thickening is made while bendability is retained. Examples of such a carrier material include, but not particularly limited to, a configuration in which two PET film substrates are laminated with the pressure-sensitive adhesive layer intervened therebetween and a configuration in which a COP film substrate and a PET film substrate are laminated with the pressure-sensitive adhesive layer intervened therebetween. The release liner may not have a carrier material.

The release liner may have a conductive-treated layer on the release layer and/or back face from the viewpoint of suppressing charging generated during transport or separation of the release liner to reduce deposition and mixing of foreign matter. Examples of such conductive-treated layers include, but not particularly limited to, a coating-treated layer that includes, as the main component, a composite of poly(3,4-ethylenedioxythiophene) (PEDOT) and polystyrene sulfonic acid (PSS), which is a conductive polymer. The release liner may not have a conductive-treated layer.

The release liner may be produced by a known and customary method. The carrier material and conductive-treated layer can be prepared by lamination on the release layer and/or back face of the release liner by a known method. The release liner of the present invention may have other layers (e.g., an intermediate layer, an undercoat layer, and the like) as long as characteristics of the present invention are not impaired.

The thickness of the release liner is, but not particularly limited to, preferably from 12 to 200 μm, more preferably from 25 to 150 μm, further preferably 38 to 125 μm, from the viewpoint of, for example, costs, the handleability of the pressure-sensitive adhesive sheet in lamination operation, and the like.

When the pressure-sensitive adhesive sheet of the present invention is a double-coated pressure-sensitive adhesive sheet of a double release liner type, a release liner is provided on one adhesive face, and a release liner is provided also on the other adhesive face. In such a case, both the release liners each are preferably a release liner in which only one of the surfaces is a release layer (particularly, a release liner in which one surface of the plastic substrate has a release layer constituted by a silicone release agent). The release liner is provided such that the release layer is in contact with the adhesive face.

Further, when the pressure-sensitive adhesive sheet of the present invention is a double-coated pressure-sensitive adhesive sheet of a double release liner type, a difference in the release strength is preferably provided between the two release liners. For example, when the pressure-sensitive adhesive sheet of the present invention is a double-coated pressure-sensitive adhesive sheet of a double release liner type, it is preferable that one of the release liners be used on the adhesive face to be used (laminated) first (also referred to as the "first face side") and the other release liner be used on the adhesive face to be used (laminated) later (also referred to as the "second face side"). Accordingly, it is preferable that the one release liner be used as the release liner on the "light release side", which can be separated with a smaller strength (release strength), and the other release liner be used as the release liner on the "heavy release side", which requires a larger strength (release strength) for the release liner to be separated from the pressure-sensitive adhesive layer. Herein, the above-described release liner on the light release side may be referred to as the "light release liner", and the above-described release liner on the heavy release face side may be referred to as the "heavy release liner".

When the pressure-sensitive adhesive sheet of the present invention is a double-coated pressure-sensitive adhesive sheet of a single release liner type, a release liner is provided on one adhesive face, and winding this release liner allows the other adhesive face of the pressure-sensitive adhesive body also to be protected by the release liner. When the pressure-sensitive adhesive sheet of the present invention is a single release liner type, both the surfaces of the release liner each are preferably a release layer (release-treated layer). Of both the release layer of the release liner, the release layer on the side to be wound and in contact with the adhesive face may be particularly referred to as the "back face release layer". The back face release layer side of the release liner is usually used for the "first face side" of the double-coated pressure-sensitive adhesive sheet.

The pressure-sensitive adhesive sheet of the present invention, to which stress relaxation properties has been imparted without lowering the molecular weight of the acrylic polymer, is preferable in that roughness and deformation of the face of the adhesive of the pressure-sensitive adhesive layer during separation of the release liner and occurrence of stick slip are suppressed to thereby enable the pressure-sensitive adhesive sheet to be stably used. Stick slip is a vibration phenomenon that occurs at a release face, breaking the object by causing damage thereto or leaving an adhesive residue partially on the object.

When the pressure-sensitive adhesive sheet of the present invention is a double-coated pressure-sensitive adhesive sheet, in respect that roughness and deformation of the face of the adhesive of the pressure-sensitive adhesive layer during separation of the release liner and occurrence of stick slip are suppressed to thereby enable the pressure-sensitive adhesive sheet to be stably used, the release strength (release liner release strength) from the pressure-sensitive adhesive layer described above on the first face side (light release side) of the release liner is from 0.01 to 0.5 N/50 mm, preferably from 0.05 to 0.25 N/50 mm, the release strength (release liner release strength) from the pressure-sensitive adhesive layer (e.g., the above-described acrylic pressure-sensitive adhesive layer, the above-described rubber pressure-sensitive adhesive layer, or the like) on the second face side (heavy release side) of the release liner is from 0.1 to 1.00 N/50 mm, preferably from 0.2 to 0.85 N/50 mm, and it is preferable that the release liner release strength on the heavy release face side be always larger than the release liner release strength on the light release face side and a release difference of the order of from 1.1 to 10.0 times be present.

Particularly, when the pressure-sensitive adhesive sheet of the present invention is a double-coated pressure-sensitive adhesive sheet, in respect that a so-called premature separation phenomenon, roughness and deformation of the face of the adhesive of the pressure-sensitive adhesive layer during separation of the release liner, and occurrence of stick slip are suppressed to thereby enable the pressure-sensitive adhesive sheet to be stably used, the difference between the release strength (release liner release strength) from the pressure-sensitive adhesive layer of the heavy release liner and the release strength (release liner release strength) from the pressure-sensitive adhesive layer of the light release liner is preferably 0.01 N/50 mm or more, more preferably 0.02 N/50 mm or more, further preferably 0.05 N/50 mm or more, particularly preferably 0.06 N/50 mm or more.

The release liner release strength described above means a 180° peel pressure-sensitive adhesive strength of the release liner to the pressure-sensitive adhesive layer as measured by a 180° release test. The tensile speed is 300 mm/minute.

[2-7. Applications and the Like of Pressure-Sensitive Adhesive Sheet]

The pressure-sensitive adhesive sheet of the present invention has the pressure-sensitive adhesive layer of the present invention (the pressure-sensitive adhesive layer formed of the pressure-sensitive adhesive composition of the present invention), and thus, the appearance of a display device and an input device is unlikely to deteriorate under low pressure conditions, The pressure-sensitive adhesive sheet of the present invention is also excellent in flexibility and can prevent display irregularities of a display device and an input device even when a film having metal wiring such as a metal mesh film or silver nanowire film is laminated. The pressure-sensitive adhesive sheet of the present invention is further excellent in adhesiveness, foaming and peeling resistance, and level difference conformability. Thus, an optical member having the pressure-sensitive adhesive sheet of the present invention is unlikely to be subjected to deterioration in the appearance under low pressure conditions, has high flexibility, sufficiently relaxes the stress to metal wiring to enable display irregularities to be prevented, and is also excellent in adhesion reliability, particularly adhesion reliability at high temperatures.

For this reason, the pressure-sensitive adhesive sheet of the present invention is usefully used in lamination of films having metal wiring such as a metal mesh film and a silver nanowire film. The pressure-sensitive adhesive sheet of the present invention is usefully used also for an object that easily generates foaming at the interface at high temperatures. For example, polymethyl methacrylate resin (PMMA) may contain an unreacted monomer and thus easily generates foaming due to foreign matter at high temperatures. Polycarbonate (PC) easily generates outgassing of water and carbon dioxide at high temperatures. The pressure-sensitive adhesive sheet of the present invention is excellent in foaming and peeling resistance and thus usefully used also for a plastic object containing such resins.

The pressure-sensitive adhesive sheet of the present invention is usefully used also for an object having a large linear expansion coefficient, in addition to an object having a small linear expansion coefficient. Examples of the above-described object having a small linear expansion coefficient include, but not particularly limited to, glass plates (linear expansion coefficient: $0.3\times10^{-5}$ to $0.8\times10^{-5}$/° C.) and polyethylene terephthalate substrates (PET films, linear expansion coefficient: $1.5\times10^{-5}$ to $2\times10^{-5}$/° C.). Examples of the above-described object having a large linear expansion coefficient include, but not particularly limited to, resin substrates having a large linear expansion coefficient, and more specific examples thereof include polycarbonate resin substrates (PC, linear expansion coefficient: $7\times10^{-5}$ to $8\times10^{-5}$/° C.), polymethyl methacrylate resin substrates (PMMA, linear expansion coefficient: $7\times10^{-5}$ to $8\times10^{-5}$/° C.), and cycloolefin polymer substrates (COP, linear expansion coefficient: $6\times10^{-5}$ to $7\times10^{-5}$/° C.), trade name "ZEONOR" (manufactured by Zeon Corporation) and trade name "ARTON" (manufactured by JSR Corporation).

The pressure-sensitive adhesive sheet of the present invention is usefully used for lamination of an object having a small linear expansion coefficient and an object having a large linear expansion coefficient. Specifically, the pressure-sensitive adhesive sheet of the present invention is preferably used for lamination of a glass object (e.g., a glass plate, chemically reinforced glass, a glass lens, or the like) and the above-described resin substrate having a large linear expansion coefficient.

As described above, the pressure-sensitive adhesive sheet of the present invention is useful for lamination of objects of various materials, and particularly usefully used for lamination of a glass object and a plastic object. The plastic object may be an optical film such as a plastic film having metal mesh wiring or silver nanowire on the surface thereof.

Further, the pressure-sensitive adhesive sheet of the present invention is usefully used also for objects having a level difference on the surface thereof such as films having metal wiring, such as metal mesh films and silver nanowire films, in addition to objects having a smooth surface. Particularly, the pressure-sensitive adhesive sheet of the present invention is usefully used for lamination of a glass object and the above-described resin substrate having a large linear expansion coefficient, even when at least one of the glass object and the resin substrate having a large linear expansion coefficient has a level difference on the surface thereof.

The pressure-sensitive adhesive sheet of the present invention is preferably used in applications for production of mobile electronic devices. Examples of the mobile electronic devices described above include mobile phones, PHS's, smartphones, tablets (tablet-type computers), mobile computers (mobile PC's), personal digital assistants (PDA's), electronic organizers, portable broadcast receiving devices such as portable televisions and portable radios, portable game machines, portable audio players, portable DVD players, cameras such as digital cameras, and camcorder-type video cameras.

The pressure-sensitive adhesive sheet of the present invention is preferably used for, for example, lamination of members or modules composing a mobile electronic device, fixing of a member or a module composing a mobile electronic device to a housing, and the like. More specific examples include lamination of cover glass or a lens (particularly a glass lens) and a touch panel or a touch sensor (particularly, a film having metal wiring such as a metal mesh film or a silver nanowire film), lamination of a polarizing plate and a touch panel or a touch sensor, lamination of a display panel and a touch panel or a touch sensor, fixing of cover glass or a lens (particularly a glass lens) to a housing, fixing of a display panel to a housing, fixing of an input device such as a sheet keyboard, a touch panel, or the like to a housing, lamination of the protection panel of an information display unit and a housing, lamination of housings, lamination of a housing and a decorative sheet, and fixing and lamination of various members or modules composing a mobile electronic device. Herein, a display panel refers to a structure composed of at least a lens (particularly a glass lens) and a touch panel. A lens herein is a concept including both of a transparent body that exhibits an action of light refraction and a transparent body that has no action of light refraction. That is, the lens herein also includes a mere window panel having no refractive action.

Further, the pressure-sensitive adhesive sheet of the present invention is preferably used for optical applications. That is, the pressure-sensitive adhesive sheet of the present invention is preferably an optical pressure-sensitive adhesive sheet for use in optical applications. More specifically, the pressure-sensitive adhesive sheet of the present invention is preferably used for, for example, applications of laminating optical members (for lamination of optical members), production applications of products in which the optical member is used (optical products), and the like.

[3. Optical Member]

The optical member of the present invention is an optical member having at least the pressure-sensitive adhesive sheet described above and a substrate. It is only required that the substrate described above comprise metal wiring (e.g., metal mesh wiring or silver nanowire) on at least one face and that the pressure-sensitive adhesive layer of the present invention (the pressure-sensitive adhesive layer formed of the pressure-sensitive adhesive composition of the present invention) be laminated on the face of the substrate on the side having the metal wiring, and other respects are not particularly limited. The pressure-sensitive adhesive sheet of the present invention may be provided with a release liner on the adhesive face until used, but the pressure-sensitive adhesive sheet in the optical member of the present invention is a pressure-sensitive adhesive sheet during use, and thus has no release liner.

From the viewpoint of obtaining a further excellent corrosion prevention effect, the optical member preferably has the pressure-sensitive adhesive layer on the side of the substrate opposite to the side having the metal wiring, and the pressure-sensitive adhesive layer is more preferably laminated on the face of the substrate on the side opposite to the side having the metal wiring.

Examples of materials constituting the metal wiring include, but not particularly limited to, metals such as titanium, silicon, niobium, indium, zinc, tin, gold, silver, copper, aluminum, cobalt, chromium, nickel, lead, iron, palladium, platinum, tungsten, zirconium, tantalum, and hafnium. Further examples include ones containing 2 or more of these metals and alloys including these metals as the main component. Of these, in respect of electrical conductivity, gold, silver, and copper are preferable, and in respect of electrical conductivity and costs, silver and copper are more preferable. That is, the metal wiring is preferably silver wiring and/or copper wiring, and particularly, copper mesh wiring, silver mesh wiring, and silver nanowire are preferable. For the purpose of higher anti-corrosion, an oxide film or metal-coated film may be provided on the metal wiring. The same applies to the material constituting the metal wiring of a touch panel mentioned below.

An optical member refers to a member having optical properties (e.g., polarizability, photorefractivity, light scattering, light reflectivity, optical transparency, optical absorptivity, optical diffractive ability, optical rotatory, and visibility). Examples of a substrate composing the optical member include, but not particularly limited to, substrates composing devices such as display devices (image display devices) and input devices or substrates for use in these devices.

Examples thereof include polarizing plates, wavelength plates, retardation plates, optical compensation films, brightness enhancing films, light-guiding panels, reflective films, antireflective films, hard-coated films (films obtained by subjecting at least one face of plastic films such as PET films to hard coat treatment), transparent conductive films (e.g., plastic films having an ITO layer on the surface thereof (preferably, ITO films such as PET-ITO, polycarbonate, and cycloolefin polymer)), design films, decorative films, surface-protective plates, prisms, lenses, color filters, transparent substrates (glass substrates such as glass sensors, glass display panels (such as LCD's), and glass plates having a transparent electrode), and further, substrates in which these are laminated (these may be collectively referred to as "functional films"). These films may also have a metal nanowire layer, an electrically-conductive polymer layer, or the like. On these films, metallic thin wires may be mesh-printed. The "plates" and "films" described above are each intended to include one in the form of plate, film, sheet, or the like. For example, "polarizing films" are intended to include "polarizing plates", "polarizing sheets", and the like. The "films" are intended to include film sensors and the like.

Particularly, the pressure-sensitive adhesive sheet of the present invention can be suitably used in transparent conductive films (metal mesh films, silver nanowire films) in which the metal wiring described above is metal mesh wiring or silver nanowire, particularly, in optical members having a metal mesh film. When optical members having metal wiring such as metal mesh films and silver nanowire films are laminated with a pressure-sensitive adhesive sheet intervened therebetween, there is a problem in that display irregularities are likely to occur in the periphery of an image display panel due to stress strain applied to the pressure-sensitive adhesive around the metal wiring or the like. Accordingly, the pressure-sensitive adhesive layer of a pressure-sensitive adhesive sheet for use in laminating optical members having metal wiring is required to have flexibility to relax the stress to the metal wiring in order to prevent such display irregularities. However, display devices or input devices comprising optical members laminated by use of a highly-flexible pressure-sensitive adhesive sheet in order to prevent display irregularities have a problem in that the appearance deteriorates under low pressure conditions in manufacture processes, cargo compartments of passenger aircrafts, highland regions, and the like.

In the pressure-sensitive adhesive sheet of the present invention, the pressure-sensitive adhesive layer of the present invention has high flexibility and can sufficiently relax the stress to the metal wiring to enable display irregularities to be prevented even when a film having metal wiring such as a metal mesh film or silver nanowire film is laminated. The appearance of display devices and input devices having the pressure-sensitive adhesive sheet of the present invention is unlikely to deteriorate even under low pressure conditions. The same applies to the metal mesh film or silver nanowire film constituting the touch panel mentioned below.

Examples of the display device include liquid crystal display devices, organic EL (electroluminescent) display devices, PDPs (plasma display panels), and electronic paper. Examples of the input device also include touch panels.

Examples of substrates composing the optical members include, but not particularly limited to, substrates comprising glass, acryl resin, polycarbonate, polyethylene terephthalate, a cycloolefin polymer, a metal thin film (e.g., substrates in a sheet, film, or plate form), or the like. The "optical members" in the present invention are intended to also include members that serve to decorate or protect a display device and an input device while keeping the visibility of the devices (design films, decorative films, surface-protective films, and the like), as described above.

When the pressure-sensitive adhesive sheet of the present invention is a pressure-sensitive adhesive sheet having a substrate, and the pressure-sensitive adhesive sheet composes a member having optical properties, the substrate can be regarded as the same as the substrate, and the pressure-sensitive adhesive sheet can be said to be also an optical member of the present invention.

When the pressure-sensitive adhesive sheet of the present invention is a pressure-sensitive adhesive sheet having a substrate, and the functional film is used as the substrate, the pressure-sensitive adhesive sheet of the present invention also can be used as a "pressure-sensitive adhesive functional film" that has the pressure-sensitive adhesive layer on at least one face of the functional film.

Next, a specific example of a particularly preferable form of the optical member of the present invention will be described with reference to the schematic view of FIG. 1.

In FIG. 1, there is depicted an optical member 1 having at least a pressure-sensitive adhesive sheet 10 and a substrate as a metal mesh film 11, the metal mesh film 11 comprising metal mesh wiring 3 on one face, the pressure-sensitive adhesive sheet 10 being laminated on the face of the metal mesh film 11 on the side having the metal mesh wiring 3.

[4. Touch Panel]

The touch panel of the present invention is a touch panel having at least the pressure-sensitive adhesive sheet and a substrate. It is only required that the substrate comprise metal wiring (e.g., metal mesh wiring or silver nanowire) on one surface and that the pressure-sensitive adhesive layer be laminated on the face of the substrate on the side having the metal wiring, and other respects are not particularly limited. The pressure-sensitive adhesive sheet in the touch panel of the present invention is a pressure-sensitive adhesive sheet during use and thus has no release liner.

As the touch panel, preferable is a form configured by laminating the optical member of the present invention with another optical member (although the member may or may not necessarily has the pressure-sensitive adhesive sheet, the member preferably has the sheet from the view point of obtaining a further excellent corrosion prevention effect). The another optical member may be a single optical member or a plurality of optical members.

Examples of the lamination form of the optical member of the present invention and the another optical member in the case of form described above include, but not particularly limited to, (1) a form in which the optical member of the present invention and the another optical member are laminated with the pressure-sensitive adhesive sheet of the present invention intervened therebetween, (2) a form in which the pressure-sensitive adhesive sheet of the present invention including or composing an optical member is laminated on the another optical member, (3) a form in which an optical member is laminated on a member other than an optical member with the pressure-sensitive adhesive tape of the present invention intervened therebetween, and (4) a form in which the pressure-sensitive adhesive tape of the present invention including or composing an optical member is laminated on a member other than an optical member. In the form (2), the pressure-sensitive adhesive sheet of the present invention is preferably a double-coated pressure-sensitive adhesive sheet of which the substrate is an optical member (e.g., an optical film).

Next, a specific example of a particularly preferable form of the touch panel of the present invention will be described with reference to the schematic view of FIG. 2.

In FIG. 2(A), a touch panel 2A is depicted which has a transparent substrate 12*a*, a pressure-sensitive adhesive sheet 10*a*, a metal mesh film 11*a*, a pressure-sensitive adhesive sheet 10*b*, and a transparent substrate 12*b* in this order and in contact mutually. The metal mesh film 11*a* comprises metal mesh wiring 3 on the face on the side of the pressure-sensitive adhesive sheet 10*b*, and the pressure-sensitive adhesive sheet 10*b* is laminated on the face of the metal mesh film 11*a* on the side having the metal mesh wiring 3. The transparent substrate 12*a* and transparent substrate 12*b* are preferably of glass, and the substrate of the metal mesh film 11*a* is preferably of PET. The pressure-sensitive adhesive sheet 10*a* may or may not be the pressure-sensitive adhesive sheet of the present invention, and is preferably the pressure-sensitive adhesive sheet of the present invention.

In FIG. 2(B), a touch panel 2B is depicted which has a transparent substrate 12*a*, a pressure-sensitive adhesive sheet 10*a*, a metal mesh film 13*a*, a pressure-sensitive adhesive sheet 10*b*, a polarizing plate 14, and a transparent substrate 12*b* in this order and in contact mutually. The metal mesh film 13*a* comprises metal mesh wiring 3 on the face on the side of the pressure-sensitive adhesive sheet 10*b*, and the pressure-sensitive adhesive sheet 10*b* is laminated on the face of the metal mesh film 13*a* on the side having the metal mesh wiring 3. The transparent substrate 12*a* is preferably of glass, and the transparent substrate 12*b* is preferably a display panel of glass such as an LCD. The pressure-sensitive adhesive sheet 10*a* may or may not be composed of the pressure-sensitive adhesive layer (the pressure-sensitive adhesive layer formed of the pressure-sensitive adhesive composition of the present invention), and is preferably composed of the pressure-sensitive adhesive layer (the pressure-sensitive adhesive layer formed of the pressure-sensitive adhesive composition of the present invention).

In FIG. 2(C), a touch panel 2C is depicted which has a transparent substrate 12*a*, a pressure-sensitive adhesive sheet 10*a*, a metal mesh film 11*b*, a pressure-sensitive adhesive sheet 10*b*, and a transparent substrate 12*b* in this order and in contact mutually. The metal mesh film 11*b* comprises metal mesh wiring 3*a* and 3*b* on both the faces, the pressure-sensitive adhesive sheet 10*a* is laminated on the face of the metal mesh film 11*b* on the side having the metal mesh wiring 3*a*, and the pressure-sensitive adhesive sheet 10*b* is laminated on the face of the metal mesh film 11*b* on the side having the metal mesh wiring 3*b*. The transparent substrate 12*a* and transparent substrate 12*b* is preferably of glass, and the substrate of the metal mesh film 11*b* is preferably of PET. It is only required that at least one of the pressure-sensitive adhesive sheet 10*a* and the pressure-sensitive adhesive sheet 10*b* be the pressure-sensitive adhesive sheet of the present invention, and both the pressure-sensitive adhesive sheet 10*a* and the pressure-sensitive adhesive sheet 10*b* are preferably the pressure-sensitive adhesive sheet of the present invention.

In FIG. 2(D), a touch panel 2D is depicted which has a transparent substrate 12*a*, a pressure-sensitive adhesive sheet 10*a*, a metal mesh film 13*b*, a pressure-sensitive adhesive sheet 10*b*, a polarizing plate 14, and a transparent substrate 12*b* in this order and in contact mutually. The metal mesh film 13*b* comprises metal mesh wiring 3*a* and 3*b* on both the faces, the pressure-sensitive adhesive sheet 10*a* is laminated on the face of the metal mesh film 13*b* on the side having the metal mesh wiring 3*a*, and the pressure-sensitive adhesive sheet 10*b* is laminated on the face of the metal mesh film 13*b* on the side having the metal mesh wiring 3*b*. The transparent substrate 12*a* is preferably of glass, and the transparent substrate 12*b* is preferably a display panel of glass such as an LCD. It is only required that at least one of the pressure-sensitive adhesive sheet 10*a* and the pressure-sensitive adhesive sheet 10*b* be composed of the pressure-sensitive adhesive layer (the pressure-sensitive adhesive layer formed of the pressure-sensitive adhesive composition of the present invention), and both the pressure-sensitive adhesive sheet 10*a* and the pressure-sensitive adhesive sheet 10*b* are preferably composed of the pressure-sensitive adhesive layer (the pressure-sensitive adhesive layer formed of the pressure-sensitive adhesive composition of the present invention).

A method for forming the metal mesh wiring on the metal mesh film is not particularly limited, and examples thereof include a method in which a metal layer provided in advance is removed by etching or the like and a printing method.

EXAMPLES

The present invention will be described hereinafter more specifically based on examples, but the present invention is not intended to be limited to these examples. The numbers of parts formulated (parts by weight) each indicate the number of parts formulated of each component described.

Production Example 1: Preparation of Prepolymer Composition A

To a monomer mixture constituted by 40.5 parts by weight of 2-ethylhexyl acrylate (2EHA), 40.5 parts by weight of isostearyl acrylate (ISTA), 18 parts by weight of N-vinyl-2-pyrrolidone (NVP), and 1 part by weight of 4-hydroxybutyl acrylate (4-HBA), 0.05 parts by weight of a photopolymerization initiator (trade name "Omnirad 184", manufactured by IGM Resins B.V.) and 0.05 parts by weight of a photopolymerization initiator (trade name "Omnirad 651", manufactured by IGM Resins B.V.) were formulated. Then, ultraviolet was applied until the viscosity (BH viscometer No. 5 rotor, 10 rpm, measurement temperature: 30° C.) reached about 20 Pa's to thereby obtain a prepolymer composition A, in which the monomer components were partially polymerized.

Production Example 2: Preparation of Prepolymer Composition B

To a monomer mixture constituted by 56 parts by weight of 2-ethylhexyl acrylate (2EHA), 24 parts by weight of isostearyl acrylate (ISTA), 14 parts by weight of N-vinyl-2-pyrrolidone (NVP), and 6 parts by weight of 4-hydroxybutyl acrylate (4-HBA), 0.035 parts by weight of a photopolymerization initiator (trade name "Omnirad 184", manufactured by IGM Resins B.V.) and 0.035 parts by weight of a photopolymerization initiator (trade name "Omnirad 651", manufactured by IGM Resins B.V.) were formulated. Then, ultraviolet was applied until the viscosity (BH viscometer No. 5 rotor, 10 rpm, measurement temperature: 30° C.) reached about 20 Pa's to thereby obtain a prepolymer composition B, in which the monomer components were partially polymerized.

Production Example 3: Preparation of Prepolymer Composition C

To a monomer mixture constituted by 56 parts by weight of 2-ethylhexyl acrylate (2EHA), 24 parts by weight of isostearyl acrylate (ISTA), 19 parts by weight of N-vinyl-2-pyrrolidone (NVP), and 1 part by weight of 4-hydroxybutyl acrylate (4-HBA), 0.035 parts by weight of a photopolymerization initiator (trade name "Omnirad 184", manufactured by IGM Resins B.V.) and 0.035 parts by weight of a photopolymerization initiator (trade name "Omnirad 651", manufactured by IGM Resins B. V.) were formulated. Then, ultraviolet was applied until the viscosity (BH viscometer No. 5 rotor, 10 rpm, measurement temperature: 30° C.) reached about 20 Pa's to thereby obtain a prepolymer composition C, in which the monomer components were partially polymerized.

Example 1

To 100 parts by weight of the prepolymer composition A obtained in Production Example 1, 3 parts by weight of hydrogenated 1,2-polybutadiene (trade name "BI-3000", number average molecular weight (Mn): 4750 (found), weight average molecular weight (Mw): 6150 (found), polydispersity (Mw/Mn): 1.30 (found), hydrogenation ratio: 97% or more (catalog value), iodine value: 21 or less (catalog value), manufactured by Nippon Soda Co., Ltd.), 12 parts by weight of hydrogenated 1,2-polybutadiene glycol (trade name "GI-2000", number average molecular weight (Mn): 3110 (found), weight average molecular weight (Mw): 5090 (found), polydispersity (Mw/Mn): 1.64 (found), hydrogenation ratio: 93% or more (catalog value), iodine value: 21 or less (catalog value), manufactured by Nippon Soda Co., Ltd.), 0.040 parts by weight of trimethylolpropane triacrylate (TMPTA), and 0.3 parts by weight of a silane coupling agent (trade name "KBM-403", manufactured by Shin-Etsu Chemical Co., Ltd.) were added and mixed to thereby obtain a pressure-sensitive adhesive composition (composition before curing).

The pressure-sensitive adhesive composition was applied on a polyethylene terephthalate (PET) release liner (heavy release liner, trade name "MRF75", manufactured by Mitsubishi Resin Co., Ltd.) such that the final thickness (thickness of the pressure-sensitive adhesive layer) was 150 μm to form an applied layer (pressure-sensitive adhesive composition layer). Then, the applied layer was covered by providing a PET release liner (light release liner, trade name "MRE75", manufactured by Mitsubishi Resin Co., Ltd.) on the applied layer to block oxygen. A laminate of MRF75/applied layer (pressure-sensitive adhesive composition layer)/MRE75 was thus obtained.

Next, this laminate was irradiated from the top face of the laminate (MRF38 side) with ultraviolet having an illuminance of 5 mW/cm$^2$ for 300 seconds using a black light (manufactured by TOSHIBA CORPORATION). Additionally, a drying treatment was conducted in a dryer at 90° C. for 2 minutes to volatilize the remaining monomers. Then, obtained was a substrateless double-coated pressure-sensitive adhesive sheet that was composed only of the pressure-sensitive adhesive layer and in which both the faces of the pressure-sensitive adhesive layer were protected with the release liners.

Examples 2 to 10 and Comparative Examples 1 to 3

Each substrateless double-coated pressure-sensitive adhesive sheet was obtained in the same manner as in Example 1 except for the composition of the pressure-sensitive adhesive composition and the thickness of the pressure-sensitive adhesive layer shown in Table 1.

TABLE 1

| Formulation | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 |
|---|---|---|---|---|---|---|---|---|---|---|---|---|---|---|
| Prepolymer composition | A | 100 | — | — | — | — | — | — | — | — | — | 100 | 100 | 100 |
| | B | — | 100 | 100 | 100 | 100 | 100 | — | — | — | — | — | — | — |
| | C | — | — | — | — | — | — | 100 | 100 | 100 | 100 | — | — | — |
| Hydrogenated polyolefin | BI-3000 | 3 | 3 | 5 | 5 | 10 | 12 | 3 | 3 | 1.5 | 1.5 | — | — | — |
| | GI-2000 | 12 | 12 | 5 | 5 | 10 | 3 | 12 | 18 | 21 | 24 | — | — | 18 |
| Polyfunctional acrylate | TMPTA | 0.040 | 0.050 | 0.035 | 0.050 | 0.050 | 0.050 | 0.050 | 0.050 | 0.070 | 0.070 | 0.020 | 0.15 | 0.04 |
| Chain transfer agent | α-Thioglycerol | — | — | — | — | — | — | — | — | — | — | — | 0.15 | — |
| Silane coupling agent | KBM-403 | 0.300 | 0.300 | 0.300 | 0.300 | 0.300 | 0.300 | 0.300 | 0.300 | 0.300 | 0.300 | 0.300 | 0.300 | 0.300 |
| Pressure-sensitive adhesive thickness (μm) | | 150 | 150 | 150 | 150 | 150 | 150 | 150 | 150 | 150 | 150 | 150 | 150 | 150 |

The details of the components shown in Table 1 are as follows.

(Prepolymer Composition)

A: Prepolymer composition A produced in Production Example 1

B: Prepolymer composition B produced in Production Example 2

C: Prepolymer composition C produced in Production Example 3

(Hydrogenated Polyolefin)

BI-2000: trade name "BI-2000", hydrogenated 1,2-polybutadiene, number average molecular weight (Mn): 2930 (found), weight average molecular weight (Mw): 4050 (found), polydispersity (Mw/Mn): 1.38 (found), hydrogenation ratio: 97% or more (catalog value), iodine value: 21 or more (catalog value), manufactured by Nippon Soda Co., Ltd.

GI-2000: trade name "GI-2000", hydrogenated 1,2-polybutadiene glycol, number average molecular weight (Mn): 3110 (found), weight average molecular weight (Mw): 5090 (found), polydispersity (Mw/Mn): 1.64 (found), hydrogenation ratio: 97% or more (catalog value), iodine value: 21 or less (catalog value), manufactured by Nippon Soda Co., Ltd.

(Polyfunctional Acrylate)

TMPTA: trimethylolpropane triacrylate (Chain Transfer Agent)

α-thioglycerol (Silane Coupling Agent)

KBM-403: trade name "KBM-403", 3-glycidoxypropyltrimethoxysilane, manufactured by Shin-Etsu Chemical Co., Ltd.

The founds of the number average molecular weight (Mn), weight average molecular weight (Mw), and polydispersity (Mw/Mn) of the hydrogenated polyolefins and non-hydrogenated polyolefin were determined from values obtained by measurement by GPC (gel permeation chromatography) under the following conditions and calculation in terms of polystyrene.

Analysis apparatus: GPC: HLC-8320GPC (TOSOH CORPORATION)

Measurement Conditions:

Column: TSKgel Super HZM-H/HZ4000/HZ3000/HZ2000

Column size: 6.0 mm I.D.×150 mm

Eluent: THE (tetrahydrofuran)

Flow rate: 0.6 mL/min

Detector: differential refractometer (RI)

Column temperature: 40° C.

Amount injected: 20 μL

The molecular weights were calculated in terms of polystyrene.

[Evaluation of Characteristics]

The following measurements and evaluations were conducted on the substrateless double-coated pressure-sensitive adhesive sheets of Examples and Comparative Examples. The evaluation results were shown in Table 2.

(1) 300% Tensile Residual Stress

Each of the substrateless double-coated pressure-sensitive adhesive sheets of Examples and Comparative Examples was cut into a size of 4 cm×4 cm, and the cut sheet was folded twice so as not to include air bubbles in the center portion to obtain a sample of 1 cm in width, 4 cm in length, and 600 μm in thickness (pressure-sensitive adhesive layer).

The sample obtained was tensioned in the lengthwise direction at an environment of 23° C. with 20 mm between chucks and a tensile speed of 200 mm/minute up to an elongation (strain) of 300% (60 mm) (80 mm between chucks after tensioning), the elongation was retained, and the tensile stress (N) applied to the sample from after lapse of 300 seconds from the completion of the tensioning was determined. The value ($N/cm^2$) obtained by dividing the tensile stress by the initial cross-sectional area (cross-sectional area before the tensioning) of the sample was defined as the 300% tensile residual stress. The initial elongation of the sample was 100%.

(2) Gel Fraction

About 0.1 g of the pressure-sensitive adhesive layer was collected from the double-coated pressure-sensitive adhesive sheet and wrapped with a porous tetrafluoroethylene sheet having an average pore diameter of 0.2 μm (trade name "NTF1122", manufactured by NITTO DENKO CORPORATION), and then tied up with a kite string. The weight at this time was measured, and this weight was defined as the weight before immersion. The weight before immersion is the total weight of the pressure-sensitive adhesive layer (the pressure-sensitive adhesive layer collected above), the tetrafluoroethylene sheet, and the kite string. The total weight of the tetrafluoroethylene sheet and the kite string is also measured, and this weight is defined as the packaging weight.

Next, the pressure-sensitive adhesive layer wrapped with the tetrafluoroethylene sheet and tied up with the kite string (referred to as the "sample") was put in a 50 ml vessel filled with ethyl acetate, followed by allowing to stand at 23° C. for 7 days. The sample (after ethyl acetate treatment) was then taken out of the vessel and transferred to an aluminum cup, followed by drying in a dryer at 130° C. for 2 hours to remove ethyl acetate. Thereafter, the weight was measured, and this weight was defined as the weight after immersion.

Then, the gel fraction was calculated according to the following formula.

$$\text{Gel fraction}[\%(\%\text{ by weight})]=(X-Y)/(Z-Y)\times 100$$

(3) Low Pressure Test

A 5 cm×10 cm display panel in a lamination structure of glass plate/polarizing plate/pressure-sensitive adhesive layer/glass plate, as a sample, was provided by lamination by pressing at 100 Pa or less and a pressure of 0.2 to 0.5 MPa for 5 seconds with a vacuum press followed by loading into an autoclave (50° C.×0.5 Mpa×15 minutes). The thickness of the glass plate is 700 μm, the thickness of the polarizing plate is 115 (polarizing plate: 95+polarizing plate adhesive: 20) μm, and the thickness of the pressure-sensitive adhesive layer is 150 μm. The display panel was allowed to stand in a thermostat under heating and reduced pressure conditions at 23800 Pa and 65° C. for 8 hours. The display panel was taken out of the thermostat. After standing of 30 minutes under normal pressure and room temperature, the diameter size and number of voids were visually measured and evaluated in accordance with the following criteria.

⊙ . . . The number of voids having a diameter of 300 μm or more is 0, and the number of voids having a diameter of not less than 50 and less than 300 μm is 0.

○ . . . The number of voids having a diameter of 300 μm or more is 0, and the number of voids having a diameter of not less than 50 and less than 300 μm is not less than 1 and less than 10.

Δ . . . The number of voids having a diameter of 300 μm or more is not less than 1 and less than 10, or the number of voids having a diameter of not less than 50 and less than 300 μm is not less than 10 and less than 20.

x . . . The number of voids having a diameter of 300 μm or more is 10 or more, or the number of voids having a diameter of not less than 50 and less than 300 μm is 20 or more.

TABLE 2

| Evaluation | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 |
|---|---|---|---|---|---|---|---|---|---|---|---|---|---|---|
| 300% tensile residual stress ($N/cm^2$) | | 3.4 | 2.8 | 3.2 | 3.7 | 2.8 | 2.9 | 3.5 | 3.0 | 2.8 | 2.6 | 6 | 1.3 | 2.6 |
| Gel fraction (%) | | 62 | 70 | 72 | 76 | 71 | 74 | 67 | 62 | 67 | 65 | 65 | 42 | 58 |
| Low pressure test | Largest diameter of voids (μm) | 100 | — | — | — | — | — | — | 200 | — | — | 200 | 500 | 500 |
| | Number of voids having diameter of 300 μm or more | 0 | 0 | 0 | 0 | 0 | 0 | 0 | 0 | 0 | 0 | 0 | 18 | 10 |

TABLE 2-continued

| Evaluation | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 |
|---|---|---|---|---|---|---|---|---|---|---|---|---|---|
| Number of voids having diameter of not less than 50 less than 300 μm | 2 | 0 | 0 | 0 | 0 | 0 | 0 | 3 | 0 | 0 | 24 | 2 | 0 |
| Evaluation | ○ | ◎ | ◎ | ◎ | ◎ | ◎ | ◎ | ○ | ◎ | ◎ | × | × | × |

Variations of the present invention will be attached below.

[Attachment 1] A pressure-sensitive adhesive sheet comprising a pressure-sensitive adhesive layer, wherein the number of the voids having a diameter of 300 μm or more in the following low pressure test is less than 10, and the number of the voids having a diameter of not less than 50 and less than 300 μm in the following low pressure test is less than 20:

<Low Pressure Test>

A 5 cm×10 cm display panel having a lamination structure of a glass plate/a polarizing plate/a pressure-sensitive adhesive layer/a glass plate is provided as a sample; the thickness of the glass plate is 700 μm, the thickness of the polarizing plate is 115 (polarizing plate: 95+polarizing plate adhesive: 20) μm, and the thickness of the pressure-sensitive adhesive layer is 150 μm; and the display panel is left to stand under heating and reduced pressure conditions at 23800 Pa and 65° C. for 8 hours, and after 30 minutes at room temperature under normal pressure, the diameter size and number of voids are visually measured.

[Attachment 2] The pressure-sensitive adhesive sheet according to attachment 1, wherein a largest diameter of voids is 600 μm or less in the low pressure test.

[Attachment 3] The pressure-sensitive adhesive sheet according to attachment 1 or 2, wherein the pressure-sensitive adhesive layer has a gel fraction of 50% or more.

[Attachment 4] The pressure-sensitive adhesive sheet according to any one of attachments 1 to 3, wherein the pressure-sensitive adhesive layer has a 300% tensile residual stress of 5 N/cm$^2$ or less.

[Attachment 5] The pressure-sensitive adhesive sheet according to any one of attachments 1 to 4, wherein the pressure-sensitive adhesive layer is formed of a pressure-sensitive adhesive composition comprising an acrylic polymer (A) and a hydrogenated polyolefinic resin (B).

[Attachment 6] The pressure-sensitive adhesive sheet according to any one of attachments 1 to 4, wherein the pressure-sensitive adhesive layer is formed of a pressure-sensitive adhesive composition comprising a mixture of monomer components constituting an acrylic polymer (A) or a partially polymerized product of the mixture of monomer components constituting the acrylic polymer (A), and a hydrogenated polyolefinic resin (B).

[Attachment 7] The pressure-sensitive adhesive sheet according to attachment 5 or 6, wherein the acrylic polymer (A) comprises a (meth)acrylic alkyl ester having an alkyl group having 8 or more carbon atoms as a constituent monomer component.

[Attachment 8] The pressure-sensitive adhesive sheet according to any one of attachments 5 to 7, wherein the hydrogenated polyolefinic resin (B) comprises a hydrogenated polyolefin.

[Attachment 9] The pressure-sensitive adhesive sheet according to attachment 8, wherein the hydrogenated polyolefinic resin (B) further comprises a hydrogenated polyolefin polyol.

[Attachment 10] The pressure-sensitive adhesive sheet according to any one of attachments 1 to 9, having a thickness of from 12 to 350 μm.

[Attachment 11] An optical member comprising at least the pressure-sensitive adhesive sheet according to any one of attachments 1 to 10 and a substrate, wherein the substrate comprises metal wiring on at least one face, and the pressure-sensitive adhesive sheet is laminated on the face of the substrate on the side having the metal wiring.

[Attachment 12] The optical member according to attachment 11, wherein the metal wiring is metal mesh wiring or silver nanowire.

[Attachment 13] A touch panel comprising at least the pressure-sensitive adhesive sheet according to any one of attachments 1 to 10 and a substrate, wherein the substrate comprises metal wiring on at least one face, and the pressure-sensitive adhesive sheet is laminated on the face of the substrate on the side having the metal wiring.

[Attachment 14] The touch panel according to attachment 13, wherein the metal wiring is metal mesh wiring or silver nanowire.

REFERENCE SIGNS LIST

1 optical member
2A to 2D touch panel
3, 3*a*, 3*b* metal mesh wiring
10*a*, 10*b* pressure-sensitive adhesive sheet
11*a*, 11*b* metal mesh film
12*a*, 12*b* transparent substrate
13*a*, 13*b* metal mesh film
14 polarizing plate

The invention claimed is:

1. A pressure-sensitive adhesive sheet comprising a pressure-sensitive adhesive layer, wherein a number of the voids having a diameter of 300 μm or more in the following low pressure test is less than 10, and a number of the voids having a diameter of not less than 50 and less than 300 μm in the following low pressure test is less than 20:

<Low pressure test>

A 5 cm×10 cm display panel having a lamination structure of a glass plate/a polarizing plate/a pressure-sensitive adhesive layer/a glass plate is provided as a sample; the thickness of the glass plate is 700 μm, the thickness of the polarizing plate is 115 (polarizing plate: 95+polarizing plate adhesive: 20) μm, and the thickness of the pressure-sensitive adhesive layer is 150 μm; and the display panel is left to stand under heating and reduced pressure conditions at 23800 Pa and 65° C. for 8 hours, and after 30 minutes at room temperature under normal pressure, the diameter size and number of voids are visually measured, wherein the pressure-sensitive adhesive layer has a 300% tensile residual stress of 5 N/cm$^2$ or less, and wherein the pressure-sensitive adhesive layer is formed of a pressure-sensitive adhesive composition comprising an acrylic polymer (A) and a hydrogenated polyolefinic resin (B), or wherein the pressure-sensitive adhesive layer is formed of a pressure-sensitive adhesive composition comprising a mixture of monomer components constituting an acrylic polymer (A) or a partially polymerized product of the mixture of monomer components constituting the acrylic polymer (A), and a hydrogenated polyolefinic resin (B).

2. The pressure-sensitive adhesive sheet according to claim 1, wherein a largest diameter of voids is 600 μm or less in the low pressure test.

3. The pressure-sensitive adhesive sheet according to claim 1, wherein the pressure-sensitive adhesive layer has a gel fraction of 50% or more.

4. The pressure-sensitive adhesive sheet according to claim 1, wherein the acrylic polymer (A) comprises a (meth)acrylic alkyl ester having an alkyl group having 8 or more carbon atoms as a constituent monomer component.

5. The pressure-sensitive adhesive sheet according to claim 1, wherein the hydrogenated polyolefinic resin (B) comprises a hydrogenated polyolefin.

6. The pressure-sensitive adhesive sheet according to claim 5, wherein the hydrogenated polyolefinic resin (B) further comprises a hydrogenated polyolefin polyol.

7. The pressure-sensitive adhesive sheet according to claim 1, having a thickness of from 12 to 350 μm.

8. An optical member comprising at least the pressure-sensitive adhesive sheet according to claim 1 and a substrate, wherein the substrate comprises metal wiring on at least one face, and the pressure-sensitive adhesive sheet is laminated on the face of the substrate on the side having the metal wiring.

9. The optical member according to claim 8, wherein the metal wiring is metal mesh wiring or silver nanowire.

10. A touch panel comprising at least the pressure-sensitive adhesive sheet according to claim 1, wherein the substrate comprises metal wiring on at least one face, and the pressure-sensitive adhesive sheet is laminated on the face of the substrate on the side having the metal wiring.

11. The touch panel according to claim 10, wherein the metal wiring is metal mesh wiring or silver nanowire.

* * * * *